United States Patent
Kuranuki et al.

(10) Patent No.: US 12,062,932 B2
(45) Date of Patent: Aug. 13, 2024

(54) POWER STORAGE PACK, ELECTRIC MOVING BODY, CHARGING DEVICE

(71) Applicant: Panasonic Intellectual Property Management Co., Ltd., Osaka (JP)

(72) Inventors: Masaaki Kuranuki, Kyoto (JP); Katsuaki Hamamoto, Osaka (JP); Ryosuke Nagase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 17/907,265

(22) PCT Filed: Mar. 18, 2021

(86) PCT No.: PCT/JP2021/010997
§ 371 (c)(1),
(2) Date: Jan. 18, 2023

(87) PCT Pub. No.: WO2021/200195
PCT Pub. Date: Oct. 7, 2021

(65) Prior Publication Data
US 2023/0155401 A1    May 18, 2023

(30) Foreign Application Priority Data
Apr. 1, 2020  (JP) ................. 2020-066045

(51) Int. Cl.
*H02J 7/00* (2006.01)
*B60L 50/60* (2019.01)
(Continued)

(52) U.S. Cl.
CPC .......... *H02J 7/00308* (2020.01); *B60L 50/60* (2019.02); *B60L 53/65* (2019.02); *B60L 53/80* (2019.02);
(Continued)

(58) Field of Classification Search
CPC .. H02J 7/00308; H02J 7/00036; H02J 7/0068; H02J 7/0031; H02J 13/00022;
(Continued)

(56) References Cited

U.S. PATENT DOCUMENTS 5,742,148 A * 4/1998 Sudo ................. H02J 7/0063
320/155
5,841,265 A * 11/1998 Sudo ................. H02J 7/0063
320/136

FOREIGN PATENT DOCUMENTS

JP    2000-152510    5/2000

OTHER PUBLICATIONS

International Search Report of PCT application No. PCT/JP2021/010997 dated May 25, 2021.

* cited by examiner

*Primary Examiner* — Jared Fureman
*Assistant Examiner* — Michael J Warmflash
(74) *Attorney, Agent, or Firm* — Rimon P.C.

(57) ABSTRACT

Controller (12) of power storage pack (10) communicates with controller (32) of electric moving body (30) in a state where power storage pack (10) is mounted to the electric moving body. Communication wiring (Lc1) connects a node of power line (Lp1) on power source terminal (Tp) side relative to first switch (RYp) and controller (12) of power storage pack (10). Overvoltage protection circuit (19) turns off second switch (SWc) inserted into communication wiring (Lc1) upon detecting an overvoltage of power line (Lp1) during communication between controller (12) of power storage pack (10) and controller (32) of the electric moving body.

8 Claims, 8 Drawing Sheets

(51) Int. Cl.
*B60L 53/65* (2019.01)
*B60L 53/80* (2019.01)
*H01M 10/42* (2006.01)
*H01M 10/46* (2006.01)

(52) U.S. Cl.
CPC ..... *H01M 10/4221* (2013.01); *H01M 10/425* (2013.01); *H01M 10/46* (2013.01); *H02J 7/00036* (2020.01); *H02J 7/0068* (2013.01); *B60L 2200/12* (2013.01); *H01M 2010/4278* (2013.01); *H01M 2220/20* (2013.01)

(58) Field of Classification Search
CPC .......... B60L 50/60; B60L 53/65; B60L 53/80; B60L 2200/12; B60L 50/64; H01M 10/4221; H01M 10/425; H01M 10/46; H01M 2010/4278; H01M 2220/20; H01M 10/44; H01M 10/0525; H01M 10/06; H01M 10/345; H01M 10/48; H01G 11/08; H01G 11/10; H01G 11/14; H02H 3/202; H02H 7/18; Y02E 60/10; Y02T 10/70; Y02T 10/7072; Y02T 90/12; Y02T 90/16

See application file for complete search history.

POWER STORAGE PACK, ELECTRIC MOVING BODY, CHARGING DEVICE

TECHNICAL FIELD

The present disclosure relates to a power storage pack capable of being mounted to and unmounted from an electric moving body, an electric moving body, and a charging device.

BACKGROUND ART

In recent years, electric motorcycles (electric scooters) and electric bicycles have become widespread. Usually, a portable battery pack capable of being mounted and unmounted is used in the electric motorcycle or the electric bicycle. When a battery is used as a power source of the motorcycle (scooter), a time required for energy supply is longer than that in a case where a liquid fuel such as gasoline is used (a charging time is longer than a fueling time).

Then, it is considered to construct a mechanism for shortening the time required for energy supply by exchanging a battery pack charged in advance with a battery pack having reduced remaining capacity at the nearest charging stand when the remaining capacity of the battery pack decreases.

In order to reduce the number of terminals of the battery pack, it is conceivable to transmit and receive control signals between the battery pack and the vehicle or the charger by wireless communication. In the above mechanism involving exchange of the battery pack, when a battery pack that transmits and receives control signals by wireless communication is used, a circumstance where a plurality of vehicles or a plurality of chargers exist in a range where wireless communication with the battery pack is possible can occur.

Under such a circumstance, there is a possibility that a controller of a certain vehicle erroneously controls a battery pack mounted into another adjacent vehicle. There is a possibility that a controller of a charger does not control a battery pack that is supposed to be controlled and is mounted into a certain charging slot but erroneously controls a battery pack that is not supposed to be controlled and is mounted into another charging slot. In such a case, safety and security of the entire charging system cannot be secured.

Therefore, the inventors of the present invention have developed a method of correctly identifying a battery pack mounted to a vehicle or a charging device by transmitting identification information from the vehicle or the charging device to the battery pack via a power line, and looping back the identification information from the battery pack to the vehicle or the charging device by wireless communication. In this method, when the identification information is transmitted via the power line, the power line and the high-voltage unit are interrupted, and the power line is used as a low-voltage signal line.

PTL 1 discloses a method of suppressing consumption of a battery by making a voltage dividing resistor of an overvoltage protection circuit that monitors the battery separable by a switch. This overvoltage protection circuit protects the battery so as not to apply an overvoltage to the battery, and does not protect a low-voltage controlling circuit from a high-voltage unit in a state where a power line interrupted from the high-voltage unit such as the battery is used as a low-voltage signal line.

CITATION LIST

Patent Literature

PTL 1: Unexamined Japanese Patent Publication No. 2000-152510

SUMMARY OF THE INVENTION

The present disclosure has been made in view of such a circumstance, and an object of the present disclosure is to provide a technique for safely performing communication using a power line between a power storage pack and an electric moving body or a charging device.

In order to solve the above problems, a power storage pack of an aspect of the present disclosure includes: a power storage unit for supplying power to an electric moving body; a power line connecting between the power storage unit and a power source terminal for charging and discharging; a first switch inserted into the power line; a controller that communicates with a controller of the electric moving body in a state where the power storage pack is mounted to the electric moving body or communicate with a controller of a charging device in a state where the power storage pack is mounted to a charging slot of the charging device; a communication wiring that connects between a node of the power line on the power source terminal side relative to the first switch and the controller of the power storage pack; a second switch inserted into the communication wiring; and an overvoltage protection circuit that protects a controller of the power storage pack from overvoltage. A controller of the power storage pack controls the first switch to be turned off and the second switch to be turned on when performing communication with a controller of the electric moving body or a controller of the charging device using the power line and the communication wiring, and the overvoltage protection circuit turns off the second switch when detecting an overvoltage of the power line during communication between a controller of the power storage pack and a controller of the electric moving body or a controller of the charging device.

According to the present disclosure, it is possible to safely perform communication using a power line between a power storage pack and an electric moving body or a charging device.

DESCRIPTION OF EMBODIMENT

Figure 1:
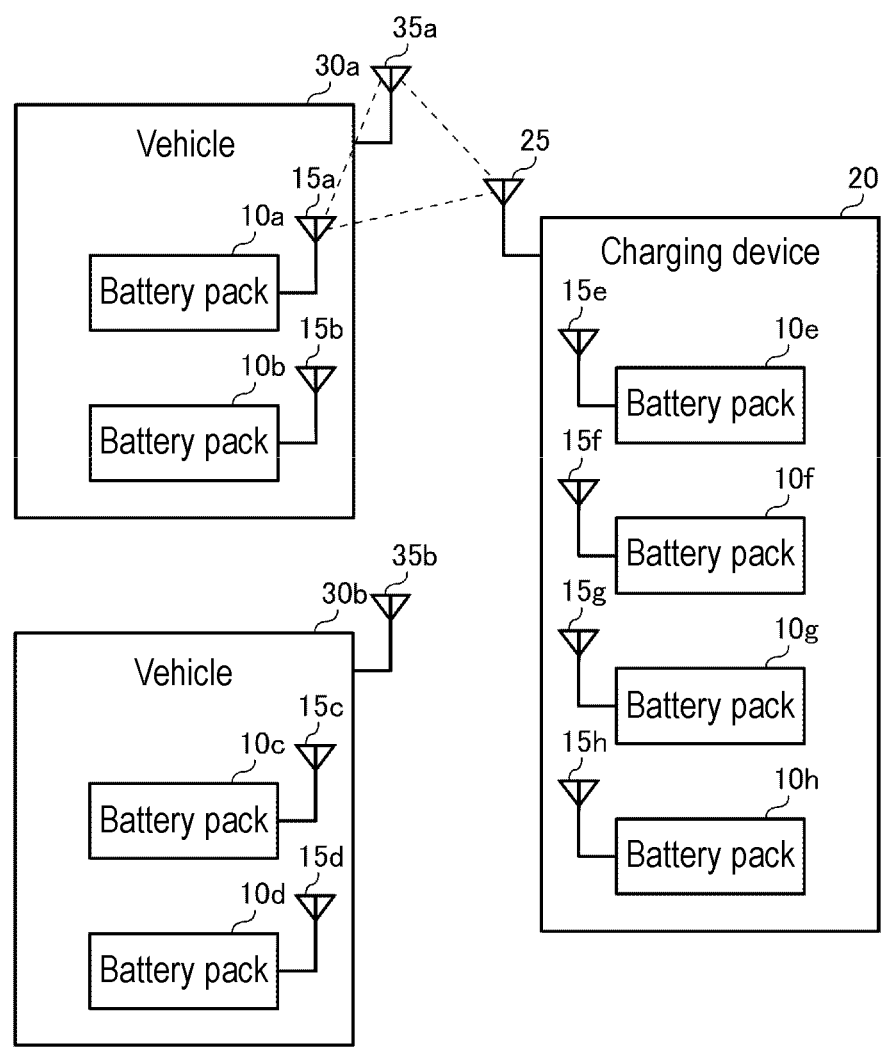
FIG. 1 is a conceptual diagram of a vehicle system using an exchangeable battery pack according to an exemplary embodiment.

FIG. 1 is a conceptual diagram of vehicle system 1 using exchangeable battery pack 10 according to an exemplary embodiment. In vehicle system 1, a plurality of battery packs 10, at least one charging device 20, and a plurality of vehicles 30 are used. In the present exemplary embodiment, an electric motorcycle (electric scooter) is assumed as vehicle 30.

Battery pack 10 is a portable or exchangeable battery pack capable of being mounted and unmounted, and can be mounted into a mounting slot of vehicle 30 and a charging slot of charging device 20. Battery pack 10 is charged in a state of being mounted into the charging slot of charging device 20. Charged battery pack 10 is taken out by a user (usually, a driver of vehicle 30) and is mounted into the mounting slot of vehicle 30. Battery pack 10 mounted into the mounting slot of vehicle 30 discharges during travelling of vehicle 30, and a remaining capacity is reduced with the discharge. Battery pack 10 having the reduced remaining capacity is taken out by the user and is mounted into the charging slot of charging device 20. The user takes out charged battery pack 10 from another charging slot of charging device 20 and mounts the charged battery pack into the mounting slot of vehicle 30. By this work, battery pack 10 having the reduced remaining capacity is exchanged with charged battery pack 10. Due to this, the user does not need to wait while battery pack 10 is charged, and can resume travelling of vehicle 30 in a short time.

In this method, since the mounting and unmounting of battery pack 10 frequently occur, degradation of a connector part of battery pack 10 coming into contact with a connector part of the mounting slot of vehicle 30 or a connector part of the charging slot of charging device 20 easily progresses. As a countermeasure against this, in the present exemplary embodiment, transmission and reception of control signals between vehicle 30 or charging device 20 and battery pack 10 by wireless communication. This can eliminate a terminal for a communication line from a connector. It is sufficient to provide a terminal for a power line in the connector. In the present exemplary embodiment, since wired communication via a connector is not used for the transmission and reception of control signals, it is possible to prevent control signals from being interrupted due to connector failure.

Near-field communication is used for wireless communication between vehicle 30 and battery pack 10, wireless communication between charging device 20 and battery pack 10, and wireless communication between vehicle 30 and charging device 20. Bluetooth (registered trademark), Wi-Fi (registered trademark), infrared communication, and the like can be used as the near-field communication. Hereinafter, in the present exemplary embodiment, it is assumed that Bluetooth (registered trademark) Low Energy (BLE) is used as the near-field communication.

The BLE is one of extended standards of Bluetooth (registered trademark), and is a low-power-consumption near-field communication standard using a 2.4 GHz band. Since the BLE has low power consumption to such an extent that the battery pack can be driven for several years with one button cell, it is suitable for battery driving, and the influence on the remaining capacity of battery pack 10 can be considered almost ignored. Since many modules for BLE communication are shipped to the market, the modules can be obtained at low cost. The BLE has high affinity with a smartphone, and can provide various services in cooperation with the smartphone.

When a general class II device is used, radio wave coverage of the BLE becomes about 10 m. Therefore, a state where there are the plurality of vehicles 30, the plurality of battery packs 10, and charging device 20 within a communication range of the BLE can occur. Since charging device 20 is provided with the plurality of charging slots, charging device 20 needs to wirelessly communicate with the plurality of battery packs 10 mounted into the plurality of charging slots. That is, a 1:N network is established between charging device 20 and the plurality of battery packs 10. Similarly, when vehicle 30 is provided with the plurality of mounting slots, vehicle 30 needs to wirelessly communicate with the plurality of battery packs 10 mounted into the plurality of mounting slots. That is, a 1:N network is established between vehicle 30 and the plurality of battery packs 10.

Therefore, a mechanism for ensuring that battery pack 10 mounted into a specific charging slot of charging device 20 and battery pack 10 of a specific communication partner of charging device 20 are identical is required. Similarly, a mechanism for ensuring that battery pack 10 mounted into a specific mounting slot of vehicle 30 and battery pack 10 of a specific communication partner of vehicle 30 are identical is required. In the present exemplary embodiment, the identity between battery pack 10 physically connected and battery pack 10 connected by wireless communication is confirmed by using identification information (ID). This identification information (ID) is sufficient to be temporal identification information. The identification information (ID) may include identification information unique to each device.

Figure 2:
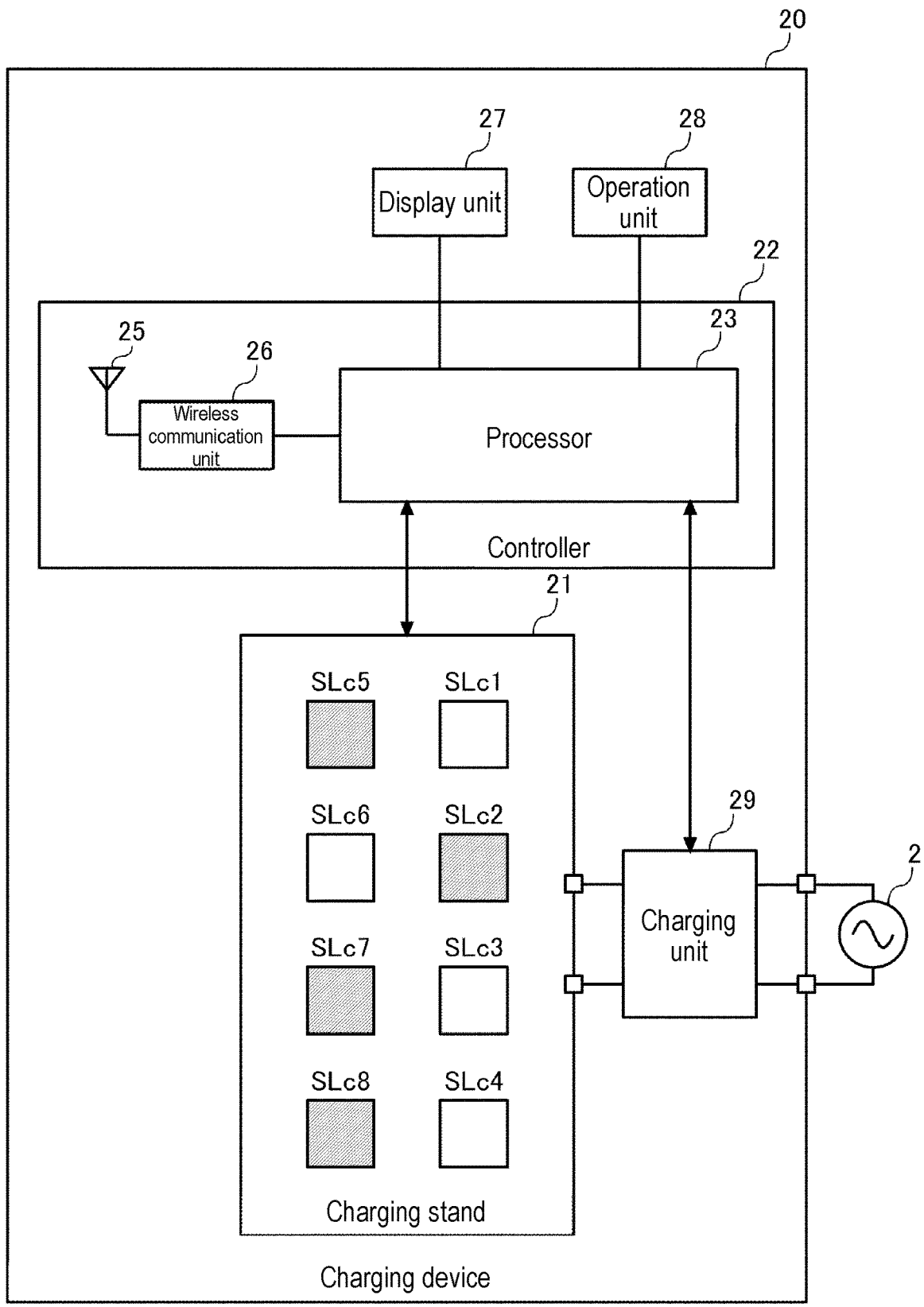
FIG. 2 is a view illustrating a configuration example of a charging device according to the exemplary embodiment.

FIG. 2 is a view illustrating a configuration example of charging device 20 according to the exemplary embodiment. Charging device 20 includes charging stand 21, controller 22, display unit 27, operation unit 28, and charging unit 29. Controller 22 at least includes processor 23, antenna 25, and wireless communication unit 26.

Charging stand 21 has a plurality of charging slots SLc1 to SLc8 for mounting the plurality of battery packs 10. Although the number of charging slots is eight in the example illustrated in FIG. 2, the number of charging slots may be two or more, and may be four, for example.

Each of charging slots SLc1 to SLc8 has a connector including a positive-electrode terminal and a negative-electrode terminal, and when battery pack 10 is mounted, the charging slots are conducted to the positive-electrode terminal and the negative-electrode terminal included in the connector of battery pack 10. A negative-electrode terminal part included in the connector of each of charging slots SLc1 to SLc8 and a negative-electrode terminal part included in the connector of battery pack 10 each may include solid GND. In this case, pins included in the connector of battery pack 10 can be integrated with one positive-electrode terminal pin, and the number of projection parts of the connector where defects are likely to occur can be reduced.

Processor 13 (see FIG. 4) of each battery pack 10 mounted into charging stand 21 transmits and receives a control signal to and from processor 23 in controller 22 by using the near-field communication and a power line. A specific transmission and reception method for the control signal between both will be described later.

The positive-electrode terminal and the negative-electrode terminal of each of charging slots SLc1 to SLc8 are connected to a positive-electrode terminal and a negative-electrode terminal of charging unit 29, respectively. Charging unit 29 is connected to commercial power system 2, and can charge battery pack 10 mounted into charging stand 21. Charging unit 29 generates DC power by performing full-wave rectifying of AC power supplied from commercial power system 2 and smoothing it by a filter.

A relay not illustrated is provided between the positive-electrode terminal and the negative-electrode terminal of charging unit 29 and between the positive-electrode terminal and the negative-electrode terminal of each of charging slots SLc1 to SLc8. Processor 23 controls conduction or interruption of each of charging slots SLc1 to SLc8 by performing control of on (close) or off (open) of the relay.

A DC/DC converter not illustrated may be provided between the positive-electrode terminal and the negative-electrode terminal of charging unit 29 and between the positive-electrode terminal and the negative-electrode terminal of each of charging slots SLc1 to SLc8. In this case, by controlling the DC/DC converter, processor 23 controls a charging voltage or a charging current of each battery pack 10. For example, constant current (CC) charging or constant voltage (CV) charging can be performed. The DC/DC converter may be provided in battery pack 10. When an AC/DC converter is equipped in battery pack 10, battery pack 10 can be charged with AC power from charging unit 29.

Processor 23 includes, for example, a microcomputer. Wireless communication unit 26 executes near-field communication processing. In the present exemplary embodiment, wireless communication unit 26 includes a BLE module, and antenna 25 includes a chip antenna or a pattern antenna built in the BLE module. Wireless communication unit 26 outputs, to processor 23, data received by the near-field communication, and transmits, by the near-field communication, data input from processor 23.

Processor 23 can acquire battery state information from battery pack 10 mounted into charging stand 21. As the battery state information, information on at least one of voltage, current, temperature, state of charge (SOC), and state of health (SOH) of a plurality of cells E1 to En (see FIG. 4) in battery pack 10 can be acquired.

Display unit 27 includes a display, and displays, on the display, guidance to the user (usually, the driver of vehicle 30) who uses charging device 20. Operation unit 28 is a user interface such as a touchscreen, and accepts an operation from the user. Charging device 20 may further include a speaker (not illustrated) to output audio guidance from the speaker to the user.

Figure 3:
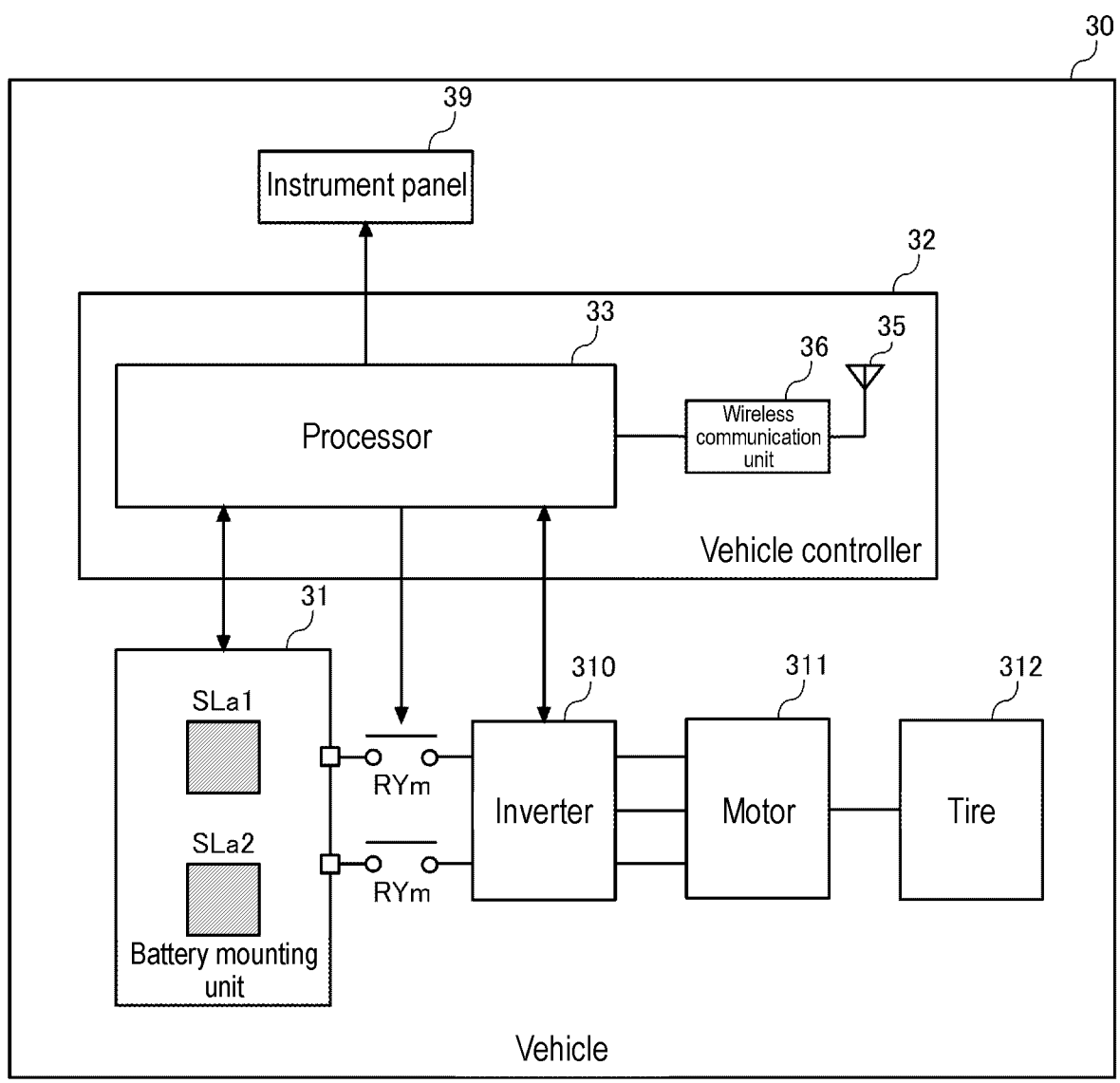
FIG. 3 is a view illustrating a configuration example of a vehicle according to the exemplary embodiment.

FIG. 3 is a view illustrating a configuration example of vehicle 30 according to the exemplary embodiment. Vehicle 30 includes battery mounting unit 31, vehicle controller 32, instrument panel 39, inverter 310, motor 311, and tire 312. Vehicle controller 32 at least includes processor 33, antenna 35, and wireless communication unit 36.

Battery mounting unit 31 has at least one of mounting slots SLa1 and SLa2 for mounting at least one battery pack 10. Although the number of mounting slots is two in the example illustrated in FIG. 3, the number of mounting slots may be one or three or more.

Each of mounting slots SLa1 and SLa2 has a connector including a positive-electrode terminal and a negative-electrode terminal, and when battery pack 10 is mounted, the mounting slots are conducted to the positive-electrode terminal and the negative-electrode terminal included in the connector of battery pack 10. A negative-electrode terminal part included in the connector of each of mounting slots SLa1 and SLa2 may include solid GND.

Processor 13 (see FIG. 4) of each battery pack 10 mounted into battery mounting unit 31 transmits and receives a control signal to and from processor 33 in vehicle controller 32 by using the near-field communication and a power line. A specific transmission and reception method for the control signal between both will be described later.

The plurality of positive-electrode terminals of the plurality of mounting slots SLa1 and SLa2 are each connected to a positive-side power bus, and the plurality of negative-electrode terminals are each connected to a negative-side power bus. Therefore, the plurality of battery packs 10 mounted into the plurality of mounting slots SLa1 and SLa2 have a relationship where they are electrically connected in parallel. Therefore, as the number of battery packs 10 mounted into battery mounting unit 31 increases, the capacity increases. The plurality of battery packs 10 mounted into the plurality of mounting slots SLa1 and SLa2 may be electrically connected in series. In that case, an output voltage can be increased.

A positive-electrode terminal and a negative-electrode terminal of battery mounting unit 31 are connected to a positive-electrode terminal and a negative-electrode terminal of inverter 310 via main relay RYm. Main relay RYm functions as a contactor between vehicle 30 and battery pack 10. Processor 33 controls conduction or interruption between vehicle 30 and battery pack 10 by performing control of on or off of main relay RYm.

Inverter 310 converts DC power supplied from battery pack 10 mounted into battery mounting unit 31 into AC power and supplies the AC power to motor 311 at the time of power running. The inverter converts AC power supplied from motor 311 into DC power and supplies the DC power to battery pack 10 mounted into battery mounting unit 31 at the time of regeneration. Motor 311 is a three-phase AC motor, and rotates in accordance with the AC power supplied from inverter 310 at the time of power running. The motor converts rotational energy by deceleration into AC power and supplies the AC power to inverter 310 at the time of regeneration. A rotary shaft of motor 311 is coupled to a rotary shaft of tire 312 of a rear wheel. A transmission may be provided between the rotary shaft of motor 311 and the rotary shaft of tire 312.

Vehicle controller 32 is a vehicle electronic control unit (ECU) that controls entire vehicle 30. Processor 33 of vehicle controller 32 includes a microcomputer. Wireless communication unit 36 executes near-field communication processing. In the present exemplary embodiment, wireless communication unit 36 includes a BLE module, and antenna 35 includes a chip antenna or a pattern antenna built in the BLE module. Wireless communication unit 36 outputs, to processor 33, data received by the near-field communication, and transmits, by the near-field communication, data input from processor 33.

Processor 33 can acquire battery state information from battery pack 10 mounted into battery mounting unit 31. As the battery state information, information on at least one of voltage, current, temperature, SOC, and SOH of the plurality of cells E1 to En (see FIG. 4) in battery pack 10 can be acquired. Processor 33 can acquire speed of vehicle 30.

Instrument panel 39 displays state information of vehicle 30. For example, the instrument panel displays the speed of vehicle 30 and the remaining capacity (SOC) of battery pack 10. The driver can judge the necessity of exchange of battery pack 10 by looking at the remaining capacity (SOC) of battery pack 10 displayed on instrument panel 39.

Figure 4:
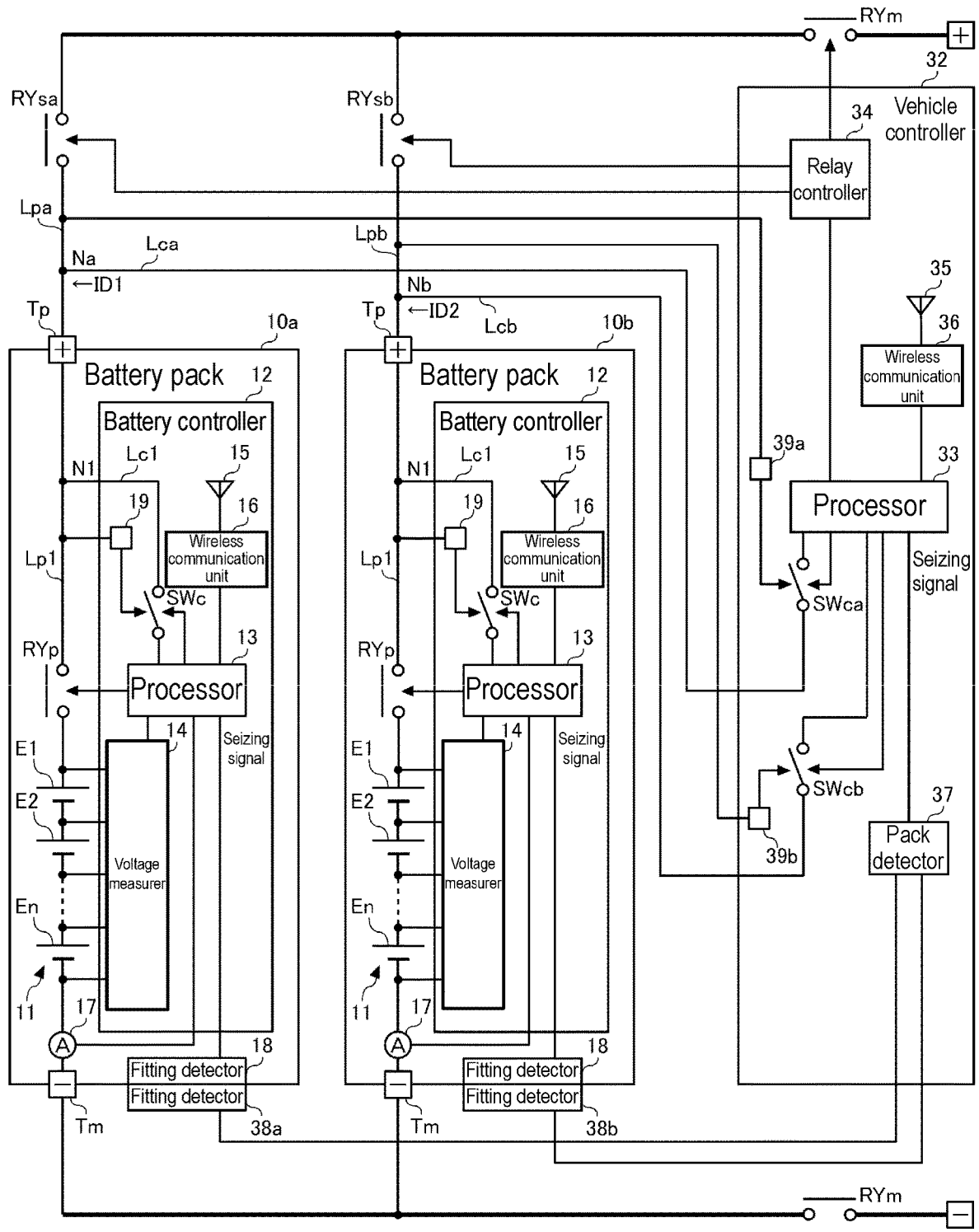
FIG. 4 is a view illustrating a system configuration example of a battery pack equipped in the vehicle and a vehicle controller according to the exemplary embodiment.

FIG. 4 is a view illustrating a system configuration example of battery pack 10 equipped in vehicle 30 and vehicle controller 32 according to the exemplary embodiment. The example illustrated in FIG. 4 presents a state where two battery packs 10a and 10b are mounted into battery mounting unit 31 of vehicle 30 (see FIG. 3).

Battery pack 10 includes battery module 11 and battery controller 12. Battery module 11 is connected on a power line internally connecting positive-electrode terminal Tp and negative-electrode terminal Tm of battery pack 10. Positive-electrode terminal Tp of battery pack 10 is connected to the positive-side power bus via slot relay RYs, and negative-electrode terminal Tm of battery pack 10 is connected to the negative-side power bus. The positive-side power bus and the negative-side power bus are connected to inverter 310 via main relay RYm (see FIG. 3).

Battery module 11 includes the plurality of cells E1 to En connected in series. Battery module 11 may be configured such that a plurality of battery modules are connected in series or in series-parallel. For the cell, a lithium ion battery cell, a nickel metal hydride battery cell, a lead battery cell, or the like can be used. Hereinafter, the present description assumes an example of use of a lithium ion battery cell (nominal voltage: 3.6 V to 3.7 V). The number of series connections of cells E1 to En is decided in accordance with a drive voltage of motor 311.

A communication path is branched from node N1 between positive-electrode terminal Tp of battery pack 10 and battery module 11. Power relay RYp is inserted between node N1 and battery module 11. Current sensor 17 is installed on a power line internally connecting positive-electrode terminal Tp and negative-electrode terminal Tm of battery pack 10. Current sensor 17 is installed at a position closer to negative-electrode terminal Tm relative to power relay RYp. Current sensor 17 measures a current flowing through battery module 11, and outputs the measured current value to processor 13 of battery controller 12. Current sensor 17 can include, for example, a combination of a shunt resistor, a differential amplifier, and an A/D converter. A Hall element may be used in place of the shunt resistor.

Battery controller 12 includes processor 13, voltage measurer 14, antenna 15, and wireless communication unit 16. A plurality of voltage measurement lines connect between voltage measurer 14 and each node of the plurality of cells E1 to En connected in series. Voltage measurer 14 measures voltage of each of cells E1 to En by measuring each voltage between adjacent two voltage measurement lines. Voltage measurer 14 transmits the measured voltage value of each of cells E1 to En to processor 13.

Voltage measurer 14 is high in voltage with respect to processor 13, and therefore voltage measurer 14 and processor 13 are connected in an insulated state by a communication line. Voltage measurer 14 can be configured using an application specific integrated circuit (ASIC) or a general-purpose analog front-end IC. Voltage measurer 14 includes a multiplexer and an A/D converter. The multiplexer outputs a voltage between adjacent two voltage measurement lines to the A/D converter in order from the top. The A/D converter converts, into a digital value, an analog voltage to be input from the multiplexer.

Although not illustrated in FIG. 4, at least one temperature sensor is installed near the plurality of cells E1 to En. The temperature sensor measures the temperature of the plurality of cells E1 to En, and outputs the measured temperature value to processor 13. The temperature sensor can include, for example, a combination of a thermistor, a voltage dividing resistor, and an A/D converter.

In a case where an A/D converter is equipped in processor 13 and an analog input port is installed in processor 13, output values of current sensor 17 and the temperature sensor can be input to processor 13 as analog values.

Fitting detector 18 detects a fitting state between the connector of battery pack 10 and the connector of battery mounting unit 31 of vehicle 30. For example, the connector on battery pack 10 may be a female connector, and the connector on battery mounting unit 31 of vehicle 30 may be a male connector. Fitting detector 18 outputs seizing signals corresponding to connection states of both to processor 13. The seizing signal is defined by a binary signal, and an on signal is output in a state where both are connected, and an off signal is output in a state where both are separated. Fitting detector 18 can include, for example, a reed switch. In this case, fitting detector 18 magnetically determines presence or absence of connection between both. A sensor that mechanically detects the presence or absence of connection between both may be used.

Wireless communication unit 16 executes near-field communication processing. In the present exemplary embodiment, wireless communication unit 16 includes a BLE module, and antenna 15 includes a chip antenna or a pattern antenna built in the BLE module. Wireless communication unit 16 outputs, to processor 13, data received by the near-field communication, and transmits, by the near-field communication, data input from processor 13.

Node N1 between positive-electrode terminal Tp of battery pack 10 and battery module 11 and processor 13 are connected by communication wiring Lc1. Pack-side communication switch SWc is inserted on communication wiring Lc1. A fuse (not illustrated) may be inserted on communication wiring Lc1 in series with pack-side communication switch SWc. The fuse functions as a protection element for preventing an overcurrent from flowing into processor 13 from power line Lp1.

Processor 13 includes a microcomputer. Processor 13 is activated when the seizing signal input from fitting detector 18 is turned on, and is shut down when the seizing signal is turned off. Instead of shutdown, transition to a standby state or a sleep state may be performed.

Processor 13 controls conduction or interruption of communication wiring Lc1 between node N1 and processor 13 by performing control of on or off of pack-side communication switch SWc. Processor 13 manages states of the plurality of cells E1 to En based on the voltage values, the current values, and the temperature values of the plurality of cells E1 to En measured by voltage measurer 14, current sensor 17, and the temperature sensor. For example, when overvoltage, undervoltage, overcurrent, high-temperature abnormality, or low-temperature abnormality occurs, processor 13 turns off power relay RYp to protect the plurality of cells E1 to En.

Processor 13 can estimate the SOC and the SOH of each of the plurality of cells E1 to En. Processor 13 can estimate the SOC by using an open circuit voltage (OCV) method or a current integration method. The SOH is defined as a ratio of current full charge capacity to initial full charge capacity, and a lower value (closer to 0%) indicates that degradation has progressed more. The SOH may be obtained by measuring the capacity through full charging and discharging, or may be obtained by adding storage degradation and cycle degradation. The storage degradation can be estimated based on the SOC, the temperature, and a storage degradation speed. The cycle degradation can be estimated based on the SOC range to be used, the temperature, the current rate, and the cycle degradation speed. The storage degradation speed and the cycle degradation speed can be derived preliminarily by an experiment or simulation. The SOC, the temperature, the SOC range, and the current rate can be obtained by measurement.

The SOH can also be estimated based on a correlation with an internal resistance of the cell. The internal resistance can be estimated by dividing, by the current value, a voltage drop occurring when a predetermined current flows through the cell for a predetermined time. The internal resistance has a relationship of decreasing as the temperature rises, and increasing as the SOH decreases.

In the system configuration example illustrated in FIG. 4, vehicle controller 32 includes processor 33, relay controller 34, antenna 35, wireless communication unit 36, and pack detector 37. Relay controller 34 performs control of on and off of each of main relay RYm, first slot relay RYsa, and second slot relay RYsb in response to an instruction from processor 33.

Node Na between positive-electrode terminal Tp of first battery pack 10a and first slot relay RYsa and processor 33 of vehicle controller 32 are connected by communication wiring Lca. First vehicle-side communication switch SWca is inserted onto communication wiring Lca. A fuse (not illustrated) may be inserted on communication wiring Lca in series with first vehicle-side communication switch SWca. Processor 33 controls conduction or interruption of communication wiring Lca between node Na and processor 33 by performing control of on or off of first vehicle-side communication switch SWca.

Similarly, node Nb between positive-electrode terminal Tp of second battery pack 10b and second slot relay RYsb and processor 33 of vehicle controller 32 are connected by communication wiring Lcb. Second vehicle-side communication switch SWcb is inserted onto communication wiring Lcb. A fuse (not illustrated) may be inserted on communication wiring Lcb in series with second vehicle-side communication switch SWcb. Processor 33 controls conduction or interruption of communication wiring Lcb between node Nb and processor 33 by performing control of on or off of second vehicle-side communication switch SWcb.

When battery mounting unit 31 of vehicle 30 is provided with three or more mounting slots, three or more slot relays RYs and three or more vehicle-side communication switches SWc on communication wiring Lc are provided in parallel.

First fitting detector 38a detects a fitting state between the connector of first mounting slot SLa1 of battery mounting unit 31 and the connector of first battery pack 10a, and outputs, to pack detector 37, a detection signal indicating presence or absence of fitting. Similarly, second fitting detector 38b detects a fitting state between the connector of second mounting slot SLa2 of battery mounting unit 31 and the connector of second battery pack 10b, and outputs, to pack detector 37, a detection signal indicating presence or absence of fitting. First fitting detector 38a and second fitting detector 38b may detect presence or absence of connection with the connector on battery pack 10 side by a magnetic method or a mechanical method.

Pack detector 37 outputs, to processor 33, seizing signals corresponding to a plurality of detection signals input from the plurality of fitting detectors 38a and 38b. In a case where at least one of the plurality of detection signals indicates a connection state, pack detector 37 outputs a seizing signal including a slot number of the connection state. In a case where all of the plurality of detection signals indicate a non-connection state, pack detector 37 controls the seizing signal to be in an off state.

Processor 33 is activated when the seizing signal input from pack detector 37 is turned on, and is shut down when the seizing signal is turned off. Instead of shutdown, transition to a standby state or a sleep state may be performed.

In the system configuration example described above, processor 33 of vehicle controller 32 can transmit and receive control signals to and from processor 13 of battery controller 12 by using near-field communication.

Processor 33 of vehicle controller 32 can transmit a control signal to processor 13 of battery controller 12 via a wired path. When communicating with processor 13 of first battery pack 10a via wire, processor 33 of vehicle controller 32 turns off first slot relay RYsa and turns on first vehicle-side communication switch SWca. Processor 13 of first battery pack 10a turns off power relay RYp in first battery pack 10a and turns on pack-side communication switch SWc. In this state, the wired path between processor 33 of vehicle controller 32 and processor 13 of first battery pack 10a is conducted in a state of being insulated from vehicle 30 and a high-voltage unit of battery pack 10. In this state, serial communication of a low voltage (for example, 5 V) corresponding to the operating voltage of the processor can be performed between processor 33 of vehicle controller 32 and processor 13 of first battery pack 10a.

Similarly, when communicating with processor 13 of second battery pack 10b via wire, processor 33 of vehicle controller 32 turns off second slot relay RYsb and turns on second vehicle-side communication switch SWcb. Processor 13 of second battery pack 10b turns off power relay RYp in second battery pack 10b and turns on pack-side communication switch SWc. In this state, the wired path between processor 33 of vehicle controller 32 and processor 13 of second battery pack 10b is conducted in a state of being insulated from vehicle 30 and a high-voltage unit of battery pack 10. In this state, serial communication of a low voltage (for example, 5 V) corresponding to the operating voltage of the processor can be performed between processor 33 of vehicle controller 32 and processor 13 of second battery pack 10b.

In the system configuration example illustrated in FIG. 4, overvoltage protection circuit 19 for protecting processor 13 of battery pack 10 from overvoltage is provided. Overvoltage protection circuit 19 turns off pack-side communication switch SWc when detecting overvoltage of the power line during communication between processor 13 of battery pack 10 and processor 33 of vehicle 30 using the power line. The section of the power line used for communication is a section between power relay RYp and slot relay RYs in battery pack 10. Overvoltage protection circuit 19 detects the voltage in the section of the power line. In FIG. 4, the voltage in the section of power line Lp1 in battery pack 10 between power relay RYp and positive-electrode terminal Tp is detected.

First overvoltage protection circuit 39a and second overvoltage protection circuit 39b for protecting processor 33 of vehicle 30 from overvoltage are provided. First overvoltage protection circuit 39a turns off first vehicle-side communication switch SWca when detecting overvoltage of the power line during communication between processor 13 of battery pack 10 and processor 33 of vehicle 30 using the power line. First overvoltage protection circuit 39a detects the voltage in a section of the power line between power relay RYp and first slot relay RYsa. In FIG. 4, the voltage in the section of power line Lpa on vehicle 30 side between positive-electrode terminal Tp and first slot relay RYsa is detected.

Similarly, second overvoltage protection circuit 39b turns off second vehicle-side communication switch SWcb when detecting overvoltage of power line Lpb during communication between processor 13 of battery pack 10 and processor 33 of vehicle 30 using the power line. Second overvoltage protection circuit 39b detects the voltage in a section of the power line between power relay RYp and second slot relay RYsb. In FIG. 4, the voltage in the section of power line Lpb on vehicle 30 side between positive-electrode terminal Tp and second slot relay RYsb is detected. Detailed configuration examples of overvoltage protection circuit 19 of battery pack 10, and first overvoltage protection circuit 39a and second overvoltage protection circuit 39b of vehicle 30 will be described later.

In the system configuration example illustrated in FIG. 4, at least one of main relay RYm, slot relay RYs, and power relay RYp may be replaced with a semiconductor switch. Communication switch SWc may be replaced with a relay.

Although not illustrated in FIG. 2, a similar configuration to that of vehicle controller 32 illustrated in FIG. 4 is also provided in controller 22 of charging device 20. In the case of vehicle 30, the connection destination of the power bus is inverter 310, but in the case of charging device 20, the connection destination of the power bus is charging unit 29. In charging device 20, the number of slots connected to the power bus is usually larger than that of vehicle 30.

Processor 23 of charging device 20 can transmit and receive control signals to and from processor 13 of battery controller 12 via the near-field communication between wireless communication unit 26 of charging device 20 and wireless communication unit 16 of battery controller 12. Processor 23 of charging device 20 can transmit a control signal to processor 13 of battery controller 12 via a wired path.

Figure 5:
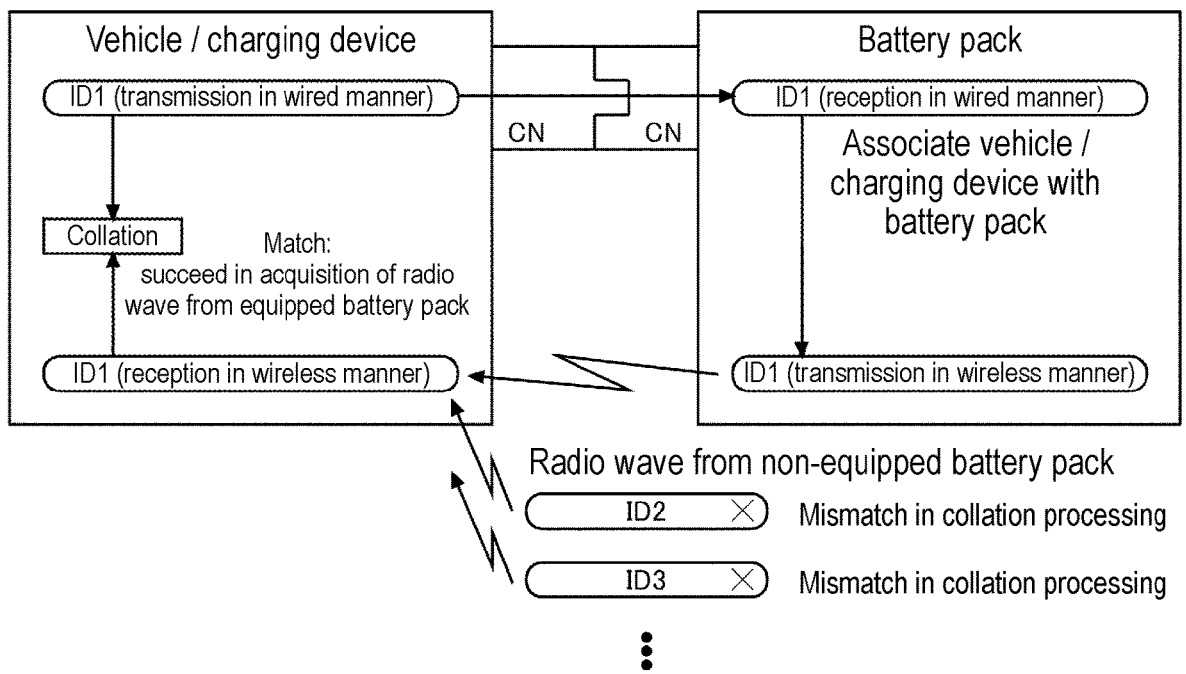
FIG. 5 is a view illustrating a basic concept of processing of authenticating, by a vehicle controller, a battery pack mounted into a mounting slot of the vehicle.

FIG. 5 is a view illustrating a basic concept of processing of authenticating, by vehicle controller 32, battery pack 10 mounted into mounting slot SLa of vehicle 30. Vehicle controller 32 identifies battery pack 10 basically by searching for a radio wave of near-field communication transmitted from battery pack 10. Specifically, when battery pack 10 is mounted into mounting slot SLa, vehicle controller 32 transmits ID1 via wire. Upon receiving ID1 from vehicle controller 32 via wire, battery controller 12 of battery pack 10 transmits a signal including ID1 by near-field communication.

Upon receiving the signal of the near-field communication, vehicle controller 32 collates ID included in the received signal with ID1 previously transmitted via wire. When both match, vehicle controller 32 authenticates that battery pack 10 mounted into mounting slot SLa and the communication partner of the near-field communication are identical. When both do not match, vehicle controller 32 determines that battery pack 10 mounted into mounting slot SLa and the communication partner of the near-field communication are not identical, and does not authenticate battery pack 10 of the communication partner. For example, when a signal including ID2 is received, since ID does not match ID1 transmitted via wire, battery pack 10 of the transmission destination of the signal including ID2 is not authenticated.

By transmitting ID by the near-field communication, and collate the transmitted ID with ID received from battery controller 12 of battery pack 10 via wire, vehicle controller 32 may judge the identity between battery pack 10 mounted into mounting slot SLa and the communication partner of the near-field communication.

Although the basic concept of the processing of authenticating, by vehicle controller 32, battery pack 10 mounted into mounting slot SLa of vehicle 30 has been described above, the same applies to a case where controller 22 of charging device 20 authenticates battery pack 10 mounted into charging slot SLc of charging device 20.

Figure 6:
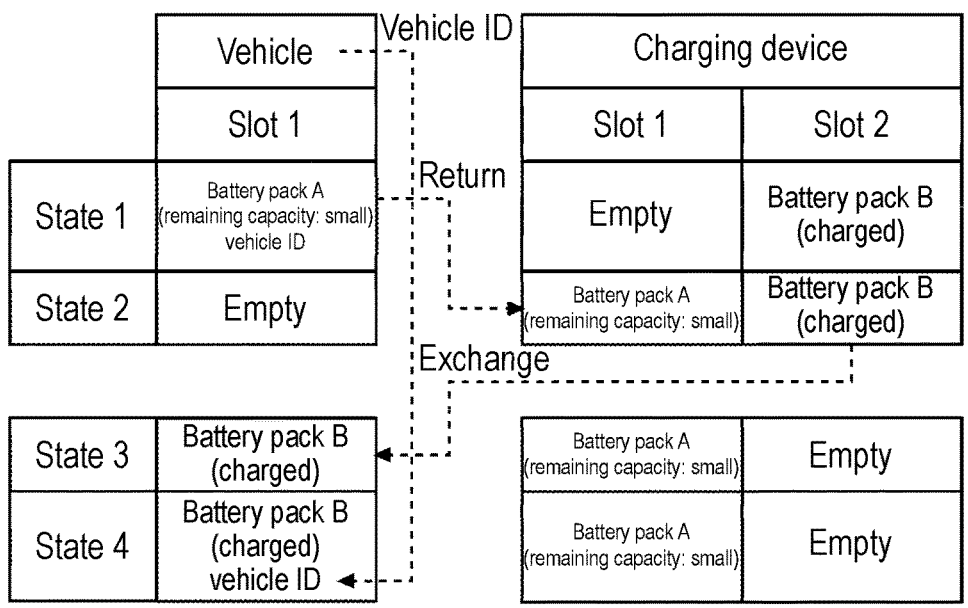
FIG. 6 is a view schematically illustrating a flow of granting ID to an exchanged battery pack when the battery pack mounted into the mounting slot of the vehicle is exchanged.

FIG. 6 is a view schematically illustrating the flow of granting ID to exchanged battery pack 10 when battery pack 10 mounted into mounting slot SLa of vehicle 30 is exchanged. In state 1, first charging slot SLc1 of charging device 20 is an empty slot, and charged second battery pack 10b is mounted into second charging slot SLc2. First battery pack 10a having a reduced remaining capacity is mounted into first mounting slot SLa1 of vehicle 30. First battery pack 10a includes a vehicle ID authenticated by vehicle controller 32. The vehicle ID ensures the identity between first battery pack 10a as a physical connection partner and first battery pack 10a as a connection partner of wireless communication as viewed from vehicle 30 side.

In state 2, the user (usually, the driver of vehicle 30) unmounts first battery pack 10a from first mounting slot SLa1 of vehicle 30, and mounts unmounted first battery pack 10a into first charging slot SLc1 of charging device 20. When first battery pack 10a is rented, a work of returning first battery pack 10a to charging device 20 is performed. When first battery pack 10a is unmounted from first mounting slot SLa1 of vehicle 30, battery controller 12 of first battery pack 10a deletes the retained vehicle ID.

In state 3, second battery pack 10b is unmounted from second charging slot SLc2 of charging device 20, and is mounted into first mounting slot SLa1 of vehicle 30 by the user. By this work, battery pack 10 mounted into first mounting slot SLa1 of vehicle 30 is physically exchanged.

In state 4, vehicle controller 32 grants a new vehicle ID to second battery pack 10b mounted into first mounting slot SLa1. This new vehicle ID ensures the identity between second battery pack 10b as a physical connection partner and second battery pack 10b as a connection partner of wireless communication as viewed from vehicle 30 side.

Figure 7:
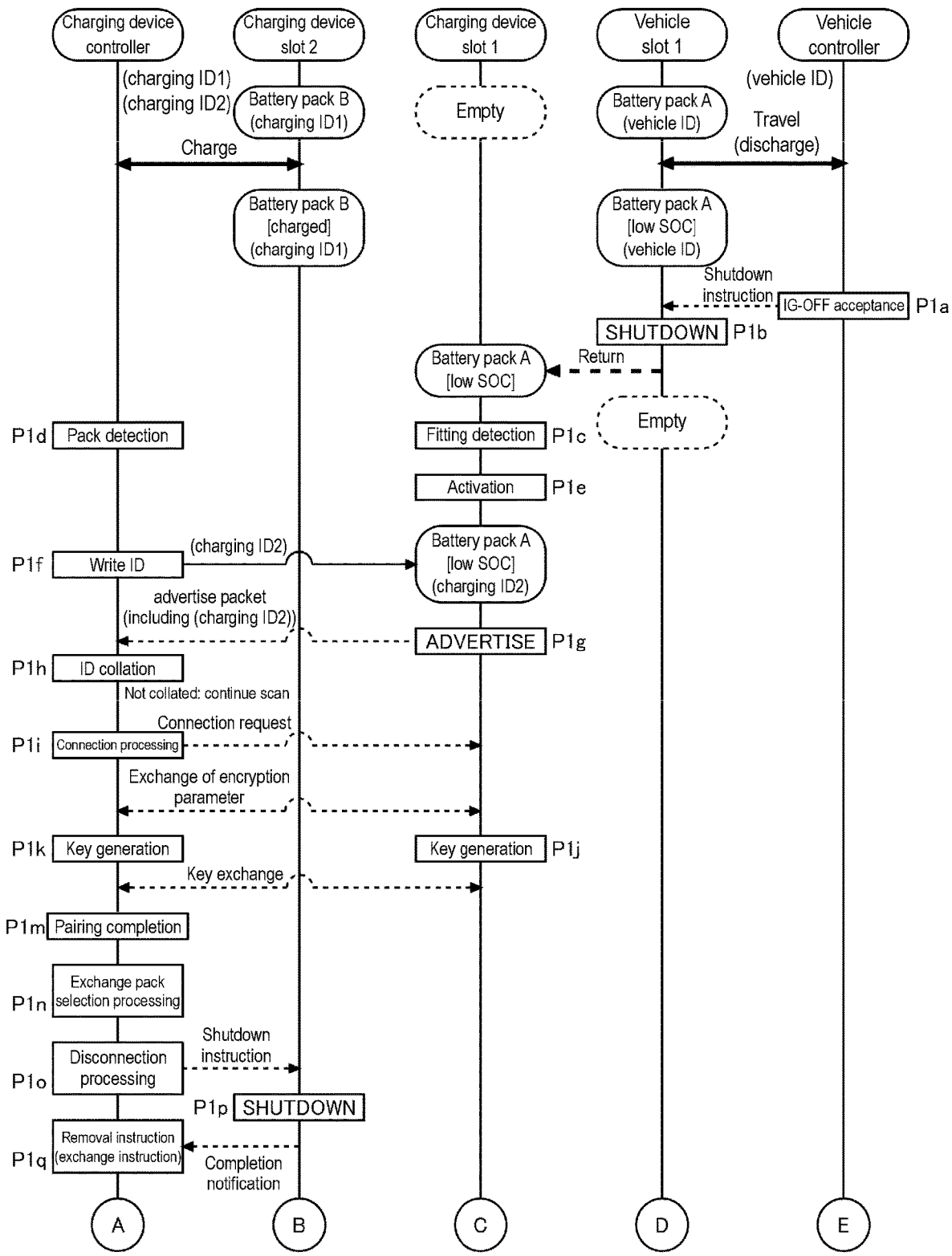
FIG. 7 is a sequence diagram illustrating a detailed processing flow when a battery pack mounted into the mounting slot of the vehicle is exchanged.
Figure 8:
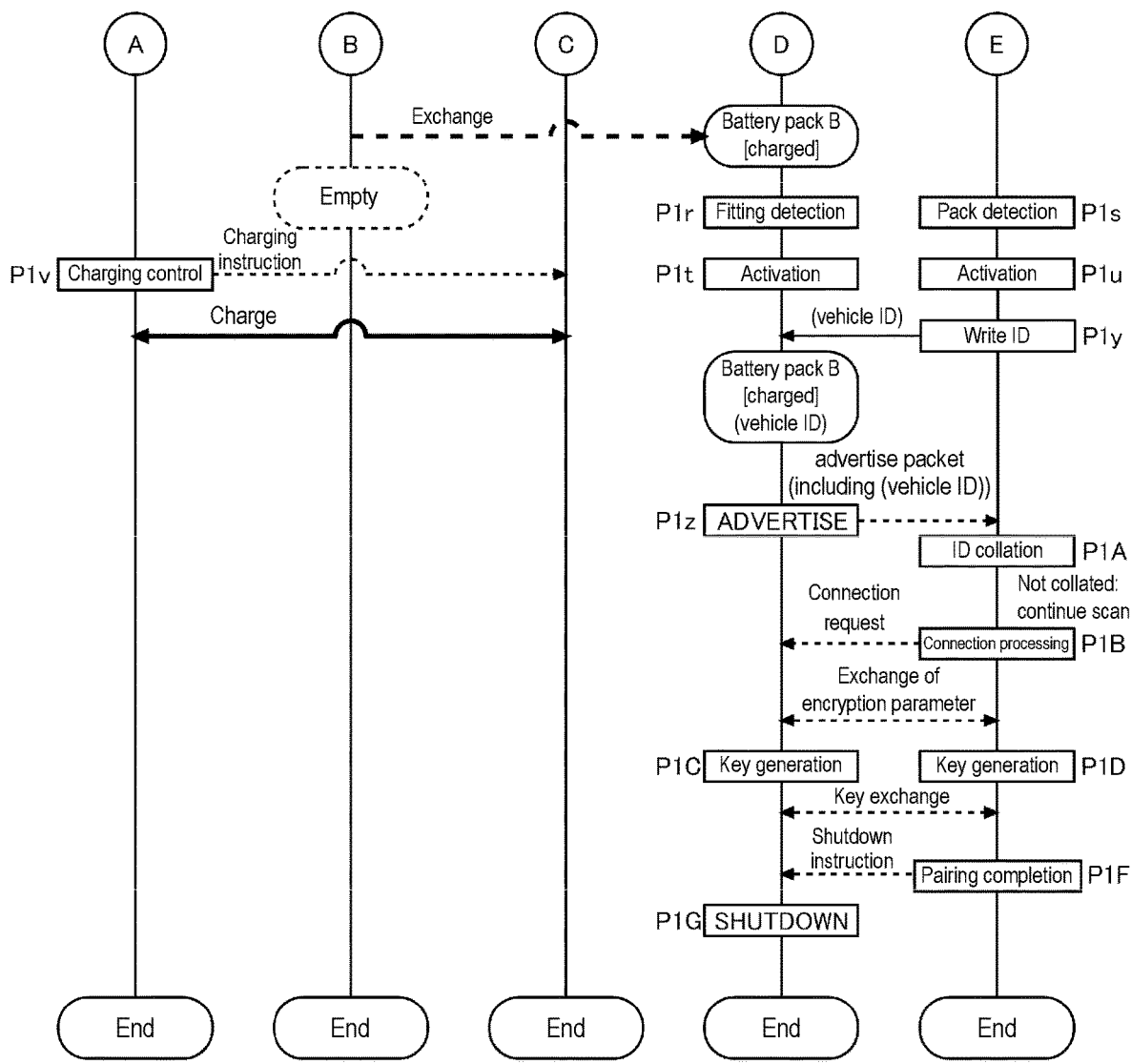
FIG. 8 is a sequence diagram illustrating a detailed processing flow when a battery pack mounted into the mounting slot of the vehicle is exchanged.

FIG. 7 is a sequence diagram illustrating a detailed processing flow when battery pack 10 mounted into mounting slot SLa of vehicle 30 is exchanged (part 1). FIG. 8 is a sequence diagram illustrating a detailed processing flow when battery pack 10 mounted into mounting slot SLa of vehicle 30 is exchanged (part 2). In horizontal lines in the following sequence diagrams, a thin dotted line indicates wireless communication, a thin solid line indicates wired communication, a thick dotted line indicates physical movement of the battery pack, and a thick solid line indicates charge and discharge of the battery pack.

First charging slot SLc1 of charging device 20 is an empty slot, and second battery pack 10b is mounted into second charging slot SLc2. Second battery pack 10b includes charging ID1 authenticated by controller 22 of charging device 20. Charging ID1 ensures the identity between second battery pack 10b as a physical connection partner and second battery pack 10b as a connection partner of wireless communication as viewed from charging device 20 side.

Charging device 20 charges second battery pack 10b mounted into second charging slot SLc2. That is, a charging current flows from charging unit 29 to second battery pack 10b mounted into second charging slot SLc2. When the SOC of second battery pack 10b reaches an upper limit value, charging ends. The upper limit value may be an SOC corresponding to a full charge capacity or an SOC (for example, 90%) lower than the full charge capacity.

First battery pack 10a is mounted into first mounting slot SLa1 of vehicle 30. First battery pack 10a includes a vehicle ID authenticated by vehicle controller 32. The vehicle ID ensures the identity between first battery pack 10a as a physical connection partner and first battery pack 10a as a connection partner of wireless communication as viewed from vehicle 30 side. While vehicle 30 is travelling, a discharging current flows from first battery pack 10a to motor 311 via inverter 310. The SOC of first battery pack 10a decreases with travel of vehicle 30.

When an ignition-off operation is performed by the user (usually, the driver of vehicle 30), vehicle controller 32 accepts the ignition-off operation (P1a). Upon accepting the ignition-off operation, vehicle controller 32 transmits a shutdown instruction to battery controller 12 of first battery pack 10a by the near-field communication. Upon receiving the shutdown instruction from vehicle controller 32, battery controller 12 of first battery pack 10a is shut down (P1b).

When first battery pack 10a is unmounted from first mounting slot SLa1 of vehicle 30 and first battery pack 10a is mounted into first charging slot SLc1 of charging device 20 by the user, fitting detector 18 of first battery pack 10a detects fitting with first charging slot SLc1 (P1c), and battery controller 12 of first battery pack 10a is activated (P1e). Controller 22 of charging device 20 detects that battery pack 10 is mounted into first charging slot SLc1 (P1d). Battery controller 12 of first battery pack 10a deletes the vehicle ID when recognizing to be unmounted from first mounting slot SLa1.

Controller 22 of charging device 20 transmits, via wire, charging ID2 to battery controller 12 of first battery pack 10a mounted into first charging slot SLc1, and writes charging ID2 to battery controller 12 of first battery pack 10a (P1f). Upon receiving charging ID2, battery controller 12 of first battery pack 10a serves as a beacon terminal (peripheral terminal) and executes advertising of the near-field communication (P1g). Specifically, battery controller 12 transmits, at regular time intervals, an advertising packet including charging ID2 received via wire as a beacon packet. The advertising packet functions as a signal for notifying controller 22 of charging device 20 or vehicle controller 32 of vehicle 30 as a central terminal of the presence of itself.

Upon receiving the advertising packet, controller 22 of charging device 20 collates the charging ID included in the received advertising packet with the charging ID previously transmitted via wire (P1h). In the example illustrated in FIG. 7, the collation succeeds if the charging ID included in the received advertising packet is charging ID2, and the collation fails if the charging ID is not charging ID2. When the collation fails, controller 22 of charging device 20 continues scanning of the advertising packet. When the collation succeeds, controller 22 of charging device 20 starts connection processing with battery controller 12 of first battery pack 10a (P1i).

First, controller 22 of charging device 20 transmits a connection request to battery controller 12 of first battery pack 10a. Next, encryption parameters (for example, the number of digits of an encryption key and an encryption level) are exchanged between controller 22 of charging device 20 and battery controller 12 of first battery pack 10a. Battery controller 12 of first battery pack 10a generates an encryption key for use in encryption of communication data based on the exchanged encryption parameters (P1j). Controller 22 of charging device 20 generates an encryption key for use in encryption of communication data based on the exchanged encryption parameters (P1k). Finally, the generated encryption key is exchanged between controller 22 of charging device 20 and battery controller 12 of first battery pack 10a. Due to this, pairing between controller 22 of charging device 20 and battery controller 12 of first battery pack 10a is completed (P1m). With the completion of the pairing of both, returning processing of first battery pack 10a to charging device 20 is completed.

Controller 22 of charging device 20 selects another battery pack 10 to be exchanged with first battery pack 10a (P1n). Specifically, controller 22 of charging device 20 selects one of charged battery packs 10 mounted into the plurality of charging slots SLc of charging stand 21. In the example illustrated in FIG. 7, charged second battery pack 10b mounted into second charging slot SLc2 is selected.

Controller 22 of charging device 20 transmits a shutdown instruction to battery controller 12 of selected second battery pack 10b by the near-field communication, and executes disconnection processing with battery controller 12 of second battery pack 10b (P1o). Upon receiving the shutdown instruction from controller 22 of charging device 20, battery controller 12 of second battery pack 10b is shut down (P1p). Battery controller 12 of second battery pack 10b transmits a shutdown completion notification to controller 22 of charging device 20 immediately before the shutdown.

Upon receiving the shutdown completion notification from battery controller 12 of second battery pack 10b, controller 22 of charging device 20 instructs the user of vehicle 30 to remove second battery pack 10b mounted into second charging slot SLc2 (P1q). For example, controller 22 of charging device 20 causes display unit 27 to display a message instructing to remove second battery pack 10b mounted into second charging slot SLc2. At this time, controller 22 of charging device 20 may output audio guidance from the speaker (not illustrated) to the user. Controller 22 may light or blink only a lamp (not illustrated) of second charging slot SLc2. Controller 22 may light only the lamp (not illustrated) of second charging slot SLc2 in a color different from color of a lamp of another charging slot.

When the user removes second battery pack 10b from second charging slot SLc2 and mounts second battery pack 10b into first mounting slot SLa1 of vehicle 30, fitting detector 18 of second battery pack 10b detects fitting with first mounting slot SLa1 (P1r), and battery controller 12 of second battery pack 10b is activated (P1t). When fitting detector 38 of vehicle 30 detects that battery pack 10 is mounted into first mounting slot SLa1 (P1s), vehicle controller 32 is activated (P1u). Battery controller 12 of second battery pack 10b deletes charging ID2 when recognizing to be unmounted from second charging slot SLc2.

Controller 22 of charging device 20 starts charging control of first battery pack 10a mounted into first charging slot SLc1 (P1v). Specifically, controller 22 of charging device 20 transmits a charging instruction to battery controller 12 of first battery pack 10a by the near-field communication, and turns on second slot relay RYsb. Upon receiving the charging instruction, battery controller 12 of first battery pack 10a turns on power relay RYp. Due to this, a charging current flows from charging unit 29 of charging device 20 to first battery pack 10a mounted into first charging slot SLc1.

Vehicle controller 32 transmits, via wire, the vehicle ID to second battery pack 10b mounted into first mounting slot SLa1, and writes the vehicle ID to battery controller 12 of second battery pack 10b (P1y). Upon receiving the vehicle ID, battery controller 12 of second battery pack 10b serves as a beacon terminal and executes advertising of the near-field communication (P1z). Specifically, battery controller 12 transmits, at regular time intervals, an advertising packet including the vehicle ID received via wire as a beacon packet.

Upon receiving the advertising packet, vehicle controller 32 collates the vehicle ID included in the received advertising packet with the vehicle ID previously transmitted via wire (P1A). When the collation of the vehicle ID fails, vehicle controller 32 continues scanning of the advertising packet. When the collation of the vehicle ID succeeds, vehicle controller 32 starts connection processing with battery controller 12 of second battery pack 10b (P1B).

First, vehicle controller 32 transmits a connection request to battery controller 12 of second battery pack 10b. Next, encryption parameters are exchanged between vehicle controller 32 and battery controller 12 of second battery pack 10b. Battery controller 12 of second battery pack 10b generates an encryption key for use in encryption of communication data based on the exchanged encryption parameters (P1C). Vehicle controller 32 generates an encryption key for use in encryption of communication data based on the exchanged encryption parameters (P1D). Finally, the generated encryption key is exchanged between vehicle controller 32 and battery controller 12 of second battery pack 10b. Due to this, pairing between vehicle controller 32 and battery controller 12 of second battery pack 10b is completed (P1F). After the pairing is completed, vehicle controller 32 transmits a shutdown instruction to battery controller 12 of second battery pack 10b by the near-field communication. Upon receiving the shutdown instruction from vehicle controller 32, battery controller 12 of second battery pack 10b is shut down (P1G).

Figure 9:
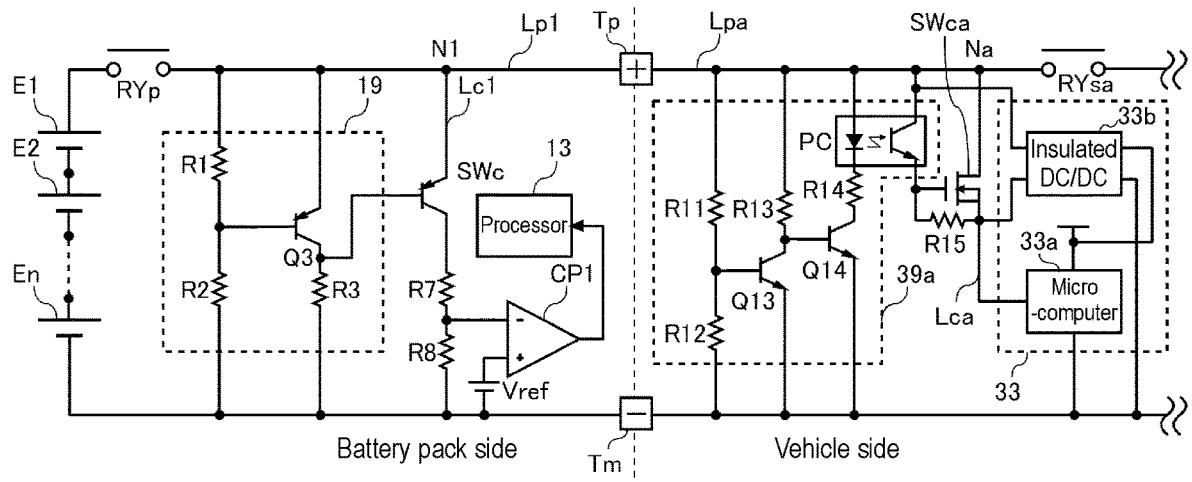
FIG. 9 is a view for explaining configuration example 1 of an overvoltage protection circuit of a first battery pack of FIG. 4 and a first overvoltage protection circuit of a vehicle.

FIG. 9 is a view for explaining configuration example 1 of overvoltage protection circuit 19 of first battery pack 10a of FIG. 4 and first overvoltage protection circuit 39a of vehicle 30. The circuit diagram illustrated in FIG. 9 illustrates a configuration related to wired communication between processor 13 of first battery pack 10a and processor 33 of vehicle 30, and appropriately omits a configuration not related to the wired communication.

A serial port of processor 33 of vehicle 30 is connected to the positive wiring of power line Lpa via first vehicle-side communication switch SWca. In configuration example 1 illustrated in FIG. 9, first vehicle-side communication switch SWca includes an N-channel MOSFET. The drain terminal of first vehicle-side communication switch SWca is connected to the positive wiring of power line Lpa, the source terminal is connected to the serial port of processor 33, and the gate terminal is connected to an output terminal of first overvoltage protection circuit 39a.

First overvoltage protection circuit 39a includes first resistor R11, second resistor R12, third resistor R13, first NPN transistor Q13, second NPN transistor Q14, fourth resistor R14, and photocoupler PC. First resistor R11 and second resistor R12 are first voltage dividing resistors connected in series between the positive wiring and the negative wiring of power line Lpa. The emitter terminal of first NPN transistor Q13 is connected to the negative wiring of power line Lpa, the collector terminal of first NPN transistor Q13 is connected to the positive wiring of power line Lpa via third resistor R13, and the base terminal of first NPN transistor Q13 is connected to the voltage dividing point of the first voltage dividing resistor. The base terminal of second NPN transistor Q14 is connected to the collector terminal of first NPN transistor Q13, the emitter terminal of second NPN transistor Q14 is connected to the negative wiring of power line Lpa, and the collector terminal of second NPN transistor Q14 is connected to the positive wiring of power line Lpa via fourth resistor R14 and a light emitting diode of photocoupler PC. As an output of first overvoltage protection circuit 39a from an emitter of a phototransistor that serves as a light-receiving element of photocoupler PC, an emitter terminal of the phototransistor is connected to a gate terminal of an N-channel MOSFET that serves as first vehicle-side communication switch SWca. Fifth resistor R15 for flowing a discharging current for turning off the N-channel MOSFET is connected between the gate terminal and the source terminal of the N-channel MOSFET.

Processor 33 of vehicle 30 includes microcomputer 33a that transmits a control signal to processor 13 of first battery pack 10a, and an insulated DC/DC converter 33b that supplies a positive power source voltage (for example, +5 V) to the collector of the phototransistor of photocoupler PC of first overvoltage protection circuit 39a and supplies a negative power source voltage (for example, GND) to the source terminal of the N-channel MOSFET. The phototransistor of photocoupler PC and the N-channel MOSFET are floated from power line Lpa by the DC/DC converter 33b.

A serial port of processor 13 of first battery pack 10a is connected to the positive wiring of power line Lp1 via comparator CP1, the second voltage dividing resistor configured by a series circuit of seventh resistor R7 and eighth resistor R8, and pack-side communication switch SWc. In configuration example 1 illustrated in FIG. 9, pack-side communication switch SWc is configured by a PNP transistor. The emitter terminal of pack-side communication switch SWc is connected to the positive wiring of power line Lp1, the collector terminal is connected to the negative wiring of power line Lp1 via the second voltage dividing resistor, and the base terminal is connected to the output terminal of overvoltage protection circuit 19. A non-inverting input terminal of comparator CP1 is connected to reference voltage source Vref, an inverting input terminal is connected to a voltage dividing point of the second voltage dividing resistor, and an output terminal is connected to a serial port of processor 13.

Overvoltage protection circuit 19 includes first resistor R1, second resistor R2, third resistor R3, and PNP transistor Q3. First resistor R1 and second resistor R2 are first voltage dividing resistors connected in series between the positive wiring and the negative wiring of power line Lp1. The emitter terminal of PNP transistor Q3 is connected to the positive wiring of power line Lp1, the collector terminal is connected to the negative wiring of power line Lp1 via third resistor R3, and the base terminal is connected to the voltage dividing point of the first voltage dividing resistor. As an output of overvoltage protection circuit 19, the collector terminal of PNP transistor Q3 is connected to the base terminal of pack-side communication switch SWc.

In the above circuit configuration, when a control signal is transmitted from processor 33 of vehicle 30 to processor 13 of first battery pack 10a, processor 33 of vehicle 30 turns off first slot relay RYsa and turns on first vehicle-side communication switch SWca. Processor 13 of first battery pack 10a turns off power relay RYp in first battery pack 10a and turns on pack-side communication switch SWc. Due to this, the section between power relay RYp of the power line and first slot relay RYsa is insulated from high-voltage battery module 11 and inverter 310 of vehicle 30. While power relay RYp and first slot relay RYsa are off, the section between power relay RYp and first slot relay RYsa can be diverted as low-voltage communication wiring.

Hereinafter, an example is assumed where the voltage of battery module 11 is 48 V, and the voltage for use in serial communication between processor 33 of vehicle 30 and processor 13 of first battery pack 10*a* is 5 V. In serial communication of 5 V, 1 (high level) is transferred at 5 V, and 0 (low level) is transmitted at 0 V.

Comparator CP1 connected to the preceding stage of processor 13 on the reception side outputs, to processor 13, high level when a voltage higher than 2.5 V is input and outputs low level when a voltage lower than 2.5 V is input. Comparator CP1 is not provided at the preceding stage of processor 13, and the voltage of the positive wiring of power line Lp1 may be configured to be input to an analog input port of processor 13 as it is. While FIG. 9 illustrates the configuration where unidirectional communication is performed from processor 33 of vehicle 30 to processor 13 of first battery pack 10*a*, a configuration where bidirectional communication is possible with a configuration where processor 33 of vehicle 30 and processor 13 of first battery pack 10*a* are symmetric.

When 5 V serial communication is performed between processor 33 of vehicle 30 and processor 13 of first battery pack 10*a*, there is a possibility that 48 V is applied, due to malfunction, to a section (hereinafter, called power line communication section) of a power line diverted as low-voltage communication wiring. For example, power relay RYp or first slot relay RYsa may be turned on at an unintended timing due to noise, vibration, a bug in firmware, or the like. In that case, a high voltage is applied to processor 13 of first battery pack 10*a* and processor 33 of vehicle 30, and defects such as breakdown in withstand voltage and abnormal heat generation occur.

As a countermeasure, it is conceivable to adopt a processor having a high withstand voltage, but in that case, the cost and the circuit area increase. When the voltage of battery module 11 is 100 V or more, the cost and the circuit area further increase.

In the circuit configuration illustrated in FIG. 9, a mechanism where overvoltage protection circuit 19 automatically turns off pack-side communication switch SWc when a high voltage is applied to the communication section of the power line, and a mechanism where first overvoltage protection circuit 39*a* automatically turns off first vehicle-side communication switch SWca are introduced.

In overvoltage protection circuit 19, the voltage dividing ratio between first resistor R1 and second resistor R2 constituting the first voltage dividing resistor is set such that the base current does not flow when the voltage in the communication section of the power line is low and the base current flows when the voltage is high. In a general bipolar transistor, a base current flows when the voltage between the base and the emitter exceeds 0.6 V to 0.7 V.

Hereinafter, a specific operation of overvoltage protection circuit 19 of first battery pack 10*a* will be described. For example, the voltage dividing ratio between first resistor R1 and second resistor R2 is set to 0.9. When the voltage in the communication section of the power line is 5 V, the base potential of PNP transistor Q3 becomes 4.5 V, the emitter potential is 5 V, and therefore, the voltage between the base and the emitter becomes 0.5 V, where the base current does not flow. In this case, PNP transistor Q3 is not conducted, and the base terminal of pack-side communication switch SWc is connected to the negative wiring of power line Lp1 via third resistor R3. Due to this, pack-side communication switch SWc is conducted.

On the other hand, when the voltage in the communication section of the power line is 48 V, the base potential of PNP transistor Q3 is about to become 43.2 V, the emitter potential is 48 V, and therefore, the voltage between the base and the emitter is clamped to about 0.6 V as a result of the base current flowing. In this case, PNP transistor Q3 is conducted, and the base terminal of pack-side communication switch SWc is connected to the positive wiring of power line Lp1 via PNP transistor Q3. Due to this, first vehicle-side communication switch SWca is interrupted.

In first overvoltage protection circuit 39*a* of vehicle 30, the voltage dividing ratio between first resistor R11 and second resistor R12 constituting the first voltage dividing resistor is set such that the base current does not flow when the voltage in the communication section of the power line is low and the base current flows when the voltage is high. For example, the voltage dividing ratio between first resistor R11 and second resistor R12 is set to 0.1. When the voltage in the communication section of the power line is 5 V, the base potential of NPN transistor Q13 becomes 0.5 V, the emitter potential is 0 V, and therefore, the voltage between the base and the emitter becomes 0.5 V, where the base current does not flow. In this case, NPN transistor Q13 is not conducted, the base potential of NPN transistor Q14 becomes 5 V, the emitter potential is 0 V, and therefore, NPN transistor Q14 has the voltage between the base and the emitter of 5 V, and enters a conductive state. Therefore, the light emitting diode of photocoupler PC becomes conductive and enters a light-emitting state. Due to this, the phototransistor of photocoupler PC enters a conductive state, a positive power source voltage and a negative power source voltage of the DC/DC converter 33*b* are applied between the gate and the source of the MOSFET of first vehicle-side communication switch SWca, and first vehicle-side communication switch SWca enters a conductive state.

On the other hand, when the voltage in the communication section of the power line is 48 V, the base potential of NPN transistor Q13 is about to become 4.8 V, the emitter potential is 0 V, and therefore the voltage between the base and the emitter is clamped to about 0.6 V as a result of the base current flowing. Therefore, NPN transistor Q13 is conducted, and the voltage between the base and the emitter of NPN transistor Q14 becomes less than 0.6 V of the conduction voltage of NPN transistor Q14. Therefore, NPN transistor Q14 is not conductive, and the light emitting diode of photocoupler PC is not conducted and is in a state of being turned off. Due to this, the phototransistor of photocoupler PC is not conducted, and first vehicle-side communication switch SWca is interrupted.

Therefore, when the voltage in the communication section of the power line is 5 V, pack-side communication switch SWc and first vehicle-side communication switch SWca are conducted, and communication is possible between processor 13 of first battery pack 10*a* and processor 33 of vehicle 30. On the other hand, when the voltage in the communication section of the power line is 48 V, pack-side communication switch SWc and first vehicle-side communication switch SWca are interrupted, and processor 13 of first battery pack 10*a* and processor 33 of vehicle 30 are protected from overvoltage.

Figure 10:
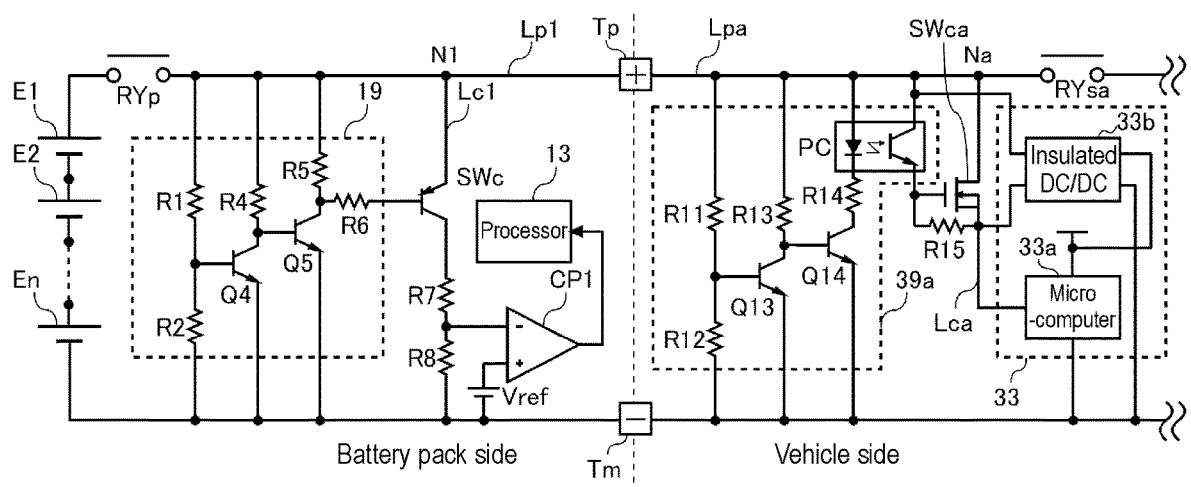
FIG. 10 is a view for explaining configuration example 2 of the overvoltage protection circuit of the first battery pack of FIG. 4 and the first overvoltage protection circuit of the vehicle.

FIG. 10 is a view for explaining configuration example 2 of overvoltage protection circuit 19 of first battery pack 10*a* of FIG. 4 and first overvoltage protection circuit 39*a* of vehicle 30. The configuration and the operation of first overvoltage protection circuit 39*a* of vehicle 30 are similar to those in configuration example 1 illustrated in FIG. 9.

In configuration example 2, overvoltage protection circuit 19 includes first resistor R1, second resistor R2, fourth resistor R4, fifth resistor R5, first NPN transistor Q4, and second NPN transistor Q5. First resistor R1 and second resistor R2 are first voltage dividing resistors connected in series between the positive wiring and the negative wiring of power line Lp1. The emitter terminal of first NPN transistor Q4 is connected to the negative wiring of power line Lp1, the collector terminal is connected to the positive wiring of power line Lp1 via fourth resistor R4, and the base terminal is connected to the voltage dividing point of the first voltage dividing resistor. The emitter terminal of second NPN transistor Q5 is connected to the negative wiring of power line Lp1, the collector terminal is connected to the positive wiring of power line Lp1 via fifth resistor R5, and the base terminal is connected to the collector terminal of first NPN transistor Q4. As an output of overvoltage protection circuit 19, the collector terminal of second NPN transistor Q5 is connected to the base terminal of pack-side communication switch SWc via sixth resistor R6.

Hereinafter, a specific operation of overvoltage protection circuit 19 of first battery pack 10a will be described. For example, the voltage dividing ratio between first resistor R1 and second resistor R2 is set to 0.1. When the voltage in the communication section of the power line is 5 V, the base potential of first NPN transistor Q4 becomes 0.5 V, the emitter potential is 0 V, and therefore, the voltage between the base and the emitter becomes 0.5 V, where the base current does not flow. In this case, first NPN transistor Q4 is not conducted, and the base terminal of second NPN transistor Q5 is connected to the positive wiring of power line Lp1 via fourth resistor R4. Due to this, second NPN transistor Q5 is conducted. When second NPN transistor Q5 is conducted, the voltage drop by fifth resistor R5 exceeds the conduction voltage between the base and the emitter of pack-side communication switch SWc, and the base terminal of pack-side communication switch SWc is connected to the negative wiring of power line Lp1 via sixth resistor R6 and second NPN transistor Q5. Due to this, pack-side communication switch SWc is conducted.

On the other hand, when the voltage in the communication section of the power line is 48 V, the base potential of first NPN transistor Q4 is about to become 4.8 V, the emitter potential is 0 V, and therefore, the voltage between the base and the emitter is clamped to about 0.6 V as a result of the base current flowing. In this case, first NPN transistor Q4 is conducted, and the base terminal of second NPN transistor Q5 is connected to the negative wiring of power line Lp1 via first NPN transistor Q4. Due to this, second NPN transistor Q5 is interrupted. When second NPN transistor Q5 is interrupted, the base terminal of pack-side communication switch SWc is connected to the positive wiring of power line Lp1 via fifth resistor R5 and sixth resistor R6. Due to this, pack-side communication switch SWc is interrupted.

Therefore, when the voltage in the communication section of the power line is 5 V, pack-side communication switch SWc and first vehicle-side communication switch SWca are conducted, and communication is possible between processor 13 of first battery pack 10a and processor 33 of vehicle 30. On the other hand, when the voltage in the communication section of the power line is 48 V, pack-side communication switch SWc and first vehicle-side communication switch SWca are interrupted, and processor 13 of first battery pack 10a and processor 33 of vehicle 30 are protected from overvoltage.

As described above, in the present exemplary embodiment, ID is written from vehicle 30 or charging device 20 to battery pack 10 via wire, and the ID is looped back from battery pack 10 to vehicle 30 or charging device 20 by the near-field communication. Due to this, vehicle 30 or charging device 20 that controls battery pack 10 by using the near-field communication can correctly identify mounted battery pack 10. There is no longer malfunctions such as erroneous control of battery pack 10 mounted in another nearby vehicle 30 by vehicle controller 32 of certain vehicle 30, and the safety and security of entire vehicle system 1 using charging device 20 and exchangeable battery pack 10 can be secured. The user can cause vehicle 30 to safely travel only by taking out battery pack 10 mounted into charging device 20 and mounting the battery pack in vehicle 30.

The number of pins included in the connector of battery pack 10 can be reduced by performing, by the near-field communication, transmission and reception of control signals between vehicle 30 or charging device 20 and battery pack 10. This makes it possible to reduce mechanical connection failure between vehicle 30 or charging device 20 and battery pack 10. The firmware used in battery controller 12 of battery pack 10 can be updated via wireless communication, and update of the firmware becomes easy.

By providing the overvoltage protection circuit, it is possible to safely perform communication between battery pack 10 and vehicle 30 or charging device 20 using the power line. That is, even when a high voltage is applied to a communication section of the power line during low-voltage communication using the communication section of the power line, each processor can be protected from overvoltage. This overvoltage protection is hardware control using a self-control type switch, and has high reliability.

The present disclosure has been described above based on the exemplary embodiment. It is to be understood by the person of ordinary skill in the art that the exemplary embodiment is an example, that combinations of its configuration elements and processing processes can have various modified examples, and that such modified examples are also within the scope of the present disclosure.

The NPN transistor in the above-described exemplary embodiment may be appropriately replaced with an N-channel FET, and the PNP transistor may be appropriately replaced with a P-channel FET. In that case, it is necessary to appropriately adjust the connection position of each resistor and the value of each resistor in accordance with the threshold voltage and the gate capacitance of the FET to be used.

In the above-described exemplary embodiment, an example of using battery pack 10 incorporating battery module 11 including the lithium ion battery cell, the nickel hydrogen battery cell, and the lead battery cell has been described. In this regard, a capacitor pack incorporating a capacitor module including an electric double layer capacitor cell and a lithium ion capacitor cell may be used. In this description, a battery pack and a capacitor pack are collectively called a power storage pack.

In the above-described exemplary embodiment, an electric motorcycle (electric scooter) is assumed as vehicle 30 using exchangeable battery pack 10 as a power source. In this regard, vehicle 30 may be an electric bicycle. Vehicle 30 may be a four-wheeled electric vehicle (EV). The electric vehicles include not only full-standard electric vehicles but also low-speed electric vehicles such as golf carts and golf cars used in shopping malls and entertainment facilities.

An electric moving body using exchangeable battery pack 10 as a power source is not limited to vehicle 30. For example, the electric moving bodies also include electric ships. For example, a power source of a water bus or a water taxi may be exchangeable battery pack 10. The electric moving bodies also include trains. For example, a train equipped with exchangeable battery pack 10 can be used instead of a diesel train used in a non-electrified railway line. The electric moving bodies also include electric flying objects. The electric flight objects include multicopters (drones). The multicopters include so-called flying cars. Any electric moving body can shorten an energy supply time.

The exemplary embodiment may be specified by the following items.

[Item 1]

Power storage pack (10) including: power storage unit (11) for supplying power to electric moving body (30); power line (Lp1) connecting between power storage unit (11) and power source terminal (Tp) for charging and discharging; first switch (RYp) inserted into power line (Lp1); controller (12) that communicates with controller (32) of electric moving body (30) in a state where power storage pack (10) is mounted to electric moving body (30) or communicate with controller (22) of charging device (20) in a state where power storage pack (10) is mounted to charging slot (SLc1) of charging device (20); communication wiring (Lc1) that connects between a node of power line (Lp1) on power source terminal (Tp) side relative to first switch (RYp) and controller (12) of power storage pack (10); second switch (SWc) inserted into communication wiring (Lc1); and overvoltage protection circuit (19) that protects controller (12) of power storage pack (10) from overvoltage, in which controller (12) of power storage pack (10) controls first switch (RYp) to be turned off and second switch (SWc) to be turned on when performing communication with controller (32) of electric moving body (30) or controller (22) of charging device (20) using power line (Lp1) and communication wiring (Lc1), and overvoltage protection circuit (19) turns off second switch (SWc) upon detecting an overvoltage of power line (Lp1) during communication between controller (12) of power storage pack (10) and controller (32) of electric moving body (30) or controller (22) of charging device (20).

This makes it possible to protect controller (12) of power storage pack (10) from an overvoltage of power line (Lp1).

[Item 2]

Power storage pack (10) according to Item 1, in which overvoltage protection circuit (19) includes voltage dividing resistor (R1 or R2) for detecting a voltage of the node of power line (Lp1), and third switch (Q3) that turns on second switch (SWc) when a divided voltage of the voltage dividing resistor (R1 or R2) exceeds a threshold voltage.

This makes it possible to highly accurately protect controller (12) of power storage pack (10) from an overvoltage by hardware control using self-control type switch (SWc).

[Item 3]

Power storage pack (10) according to Item 2, in which second switch (SWc) and third switch (Q3) are PNP transistors, voltage dividing resistor (R1 or R2) is connected between a positive wiring and a negative wiring of power line (Lp1), an emitter of third switch (Q3) is connected to a positive wiring of power line (Lp1), a collector of third switch (Q3) is connected to a negative wiring of power line (Lp1) via a resistor (R3), and a base of third switch (Q3) is connected to a voltage dividing point of voltage dividing resistor (R1 or R2), and an emitter of second switch (SWc) is connected to a positive wiring of power line (Lp1), a collector of second switch (SWc) is connected to controller (12) of power storage pack (10), and a base of second switch (SWc) is connected to a collector of third switch (Q3).

This makes it possible for a two-stage PNP transistor to highly accurately protect controller (12) of power storage pack (10) from overvoltage.

[Item 4]

Power storage pack (10) according to any one of Items 1 to 3, in which upon receiving identification information from controller (32) of electric moving body (30) or controller (22) of charging device (20) via power line (Lp1) and communication wiring (Lc1), controller (12) of power storage pack (10) transmits a signal including the identification information by near-field communication, and a signal transmitted in the near-field communication is used by controller (32) of electric moving body (30) or controller (22) of charging device (20) to authenticate whether or not power storage pack (10) mounted into electric moving body (30) or charging slot (SLc1) and a communication partner of the near-field communication are identical.

This makes it possible for controller (32) of electric moving body (30) or controller (22) of charging device (20) to accurately authenticate whether or not power storage pack (10) mounted into electric moving body (30) or charging slot (SLc1) and the communication partner of the near-field communication are identical.

[Item 5]

Electric moving body (30) including: motor (311); power line (Lpa) that connects between motor (311) and power source terminal (Tp) that receives power supplying from an outside; first switch (RYsa) inserted into power line (Lpa); controller (32) that communicates with controller (12) of power storage pack (10) in a state where power storage pack (10) for supplying power to motor (311) is mounted to electric moving body (30); communication wiring (Lca) that connects between a node of power line (Lpa) on power source terminal (Tp) side relative to first switch (RYsa) and controller (32) of electric moving body (30); second switch (SWca) inserted into communication wiring (Lca); and overvoltage protection circuit (39a) that protects controller (32) of electric moving body (30) from overvoltage, in which controller (32) of electric moving body (30) controls first switch (RYsa) to be turned off and second switch (SWca) to be turned on when performing communication with controller (12) of power storage pack (10) using power line (Lpa) and communication wiring (Lca), and overvoltage protection circuit (39a) turns off second switch (SWca) upon detecting an overvoltage of power line (Lpa) during communication between controller (32) of electric moving body (30) and controller (12) of power storage pack (10).

This makes it possible to protect controller (32) of electric moving body (30) from overvoltage of power line (Lpa).

[Item 6]

Electric moving body (30) according to Item 5, in which controller (32) of electric moving body (30) transmits identification information to controller (12) of power storage pack (10) via power line (Lpa) and communication wiring (Lca) when power storage pack (10) is mounted to electric moving body (30), and collates whether or not identification information included in a received signal matches the transmitted identification information when receiving a signal transmitted by near-field communication, and authenticates that power storage pack (10) mounted to electric moving body (30) and a communication partner of the near-field communication are identical when the identification information included in the received signal matches the transmitted identification information.

This makes it possible for controller (32) of electric moving body (30) to accurately authenticate whether or not power storage pack (10) mounted to electric moving body (30) and the communication partner of the near-field communication are identical.

[Item 7]

Charging device (20) including: charging slot (SLc1); power line (Lpa) that connects between charging source (29) and power source terminal (Tp) of charging slot (SLc1); first switch (RYsa) inserted into power line (Lpa); controller (22) that communicates with controller (12) of power storage pack (10) in a state where power storage pack (10) is mounted into charging slot (SLc1); communication wiring (Lca) that connects between a node of power line (Lpa) on power source terminal (Tp) side relative to first switch (RYsa) and controller (22) of charging device (20); second switch (SWca) inserted into communication wiring (Lca); and overvoltage protection circuit (39a) that protects controller (22) of charging device (20) from overvoltage, in which controller (22) of charging device (20) controls first switch (RYsa) to be turned off and second switch (SWca) to be turned on when performing communication with controller (12) of power storage pack (10) using power line (Lpa) and communication wiring (Lca), and overvoltage protection circuit (39a) turns off second switch (SWca) upon detecting an overvoltage of power line (Lpa) during communication between controller (22) of charging device (20) and controller (12) of power storage pack (10).

This makes it possible to protect controller (22) of charging device (20) from overvoltage of power line (Lpa).

[Item 8]

Charging device (20) according to Item 7, in which controller (22) of charging device (20) transmits identification information to controller (12) of power storage pack (10) via power line (Lpa) and communication wiring (Lca) when power storage pack (10) is mounted to charging slot (SLc1), and collates whether or not identification information included in a received signal matches the transmitted identification information when receiving a signal transmitted by near-field communication, and authenticates that power storage pack (10) mounted to charging slot (SLc1) and a communication partner of the near-field communication are identical when the identification information included in the received signal matches the transmitted identification information.

This makes it possible for controller (22) of charging device (20) to accurately authenticate whether or not power storage pack (10) mounted into charging slot (SLc1) and the communication partner of the near-field communication are identical.

REFERENCE MARKS IN THE DRAWINGS

1: vehicle system
2: commercial power system
10: battery pack
11: battery module
E1-En: cell
12: battery controller
13: processor
14: voltage measurer
15: antenna
16: wireless communication unit
17: current sensor
18: fitting detector
19: overvoltage protection circuit
20: charging device
21: charging stand
SLc: charging slot
22: controller
23: processor
25: antenna
26: wireless communication unit
27: display unit
28: operation unit
29: charging unit
30: vehicle
31: battery mounting unit
SL1: mounting slot
32: vehicle controller
33: processor
33a: microcomputer
33b: DC/DC converter
34: relay controller
35: antenna
36: wireless communication unit
37: pack detector
38: fitting detector
39: instrument panel
39a: first overvoltage protection circuit
39b: second overvoltage protection circuit
310: inverter
311: motor
312: tire
RYm: main relay
RYs: slot relay
RYp: power relay
SWc: pack-side communication switch
SWca: first vehicle-side communication switch
SWcb: second vehicle-side communication switch
Q3: PNP transistor
Q4, Q5, Q13, Q14: NPN transistor
R1, R2, R3, R4, R5, R6, R7, R8, R11, R12, R13, R14, R15: resistor
PC: photocoupler
CP1: comparator
Tp: positive-electrode terminal
Tm: negative-electrode terminal

The invention claimed is:

1. A power storage pack comprising:
a power storage unit for supplying power to an electric moving body;
a power line connecting between the power storage unit and a power source terminal for charging and discharging;
a first switch inserted into the power line;
a controller that communicates with a controller of the electric moving body in a state where the power storage pack is mounted to the electric moving body or communicate with a controller of a charging device in a state where the power storage pack is mounted to a charging slot of the charging device;
a communication wiring that connects between a node of the power line closer to the power source terminal relative to the first switch and the controller of the power storage pack;
a second switch inserted into the communication wiring; and
an overvoltage protection circuit that protects the controller of the power storage pack from overvoltage,
wherein
the controller of the power storage pack that performs communication with the controller of the electric moving body or the controller of the charging device using the power line and the communication wiring, the controller of the power storage pack causing the first switch to be turned off and the second switch to be turned on, and
the overvoltage protection circuit turns off the second switch upon detecting an overvoltage of the power line during communication between the controller of the power storage pack and the controller of the electric moving body or the controller of the charging device.

2. The power storage pack according to claim 1, wherein the overvoltage protection circuit includes
a voltage dividing resistor for detecting a voltage of the node of the power line, and
a third switch that turns on the second switch when a divided voltage of the voltage dividing resistor exceeds a threshold voltage.

3. The power storage pack according to claim 2, wherein the second switch and the third switch are PNP transistors,
the voltage dividing resistor is connected between a positive wiring and a negative wiring of the power line,
an emitter of the third switch is connected to the positive wiring of the power line, a collector of the third switch is connected to the negative wiring of the power line via a resistor, and a base of the third switch is connected to a voltage dividing point of the voltage dividing resistor, and
an emitter of the second switch is connected to the positive wiring of the power line, a collector of the second switch is connected to the controller of the power storage pack, and a base of the second switch is connected to the collector of the third switch.

4. The power storage pack according to claim 1, wherein
upon receiving identification information from the controller of the electric moving body or the controller of the charging device via the power line and the communication wiring, the controller of the power storage pack transmits a signal including the identification information by near-field communication, and
a signal transmitted in the near-field communication is used by the controller of the electric moving body or the controller of the charging device to authenticate whether or not the power storage pack mounted into the electric moving body or the charging slot and a communication partner of the near-field communication are identical.

5. An electric moving body comprising:
a motor;
a power line that connects between the motor and a power source terminal that receives power supply from an outside;
a first switch inserted into the power line;
a controller that communicates with a controller of a power storage pack in a state where the power storage pack for supplying power to the motor is mounted to the electric moving body;
a communication wiring that connects between a node of the power line closer to the power source terminal relative to the first switch and the controller of the electric moving body;
a second switch inserted into the communication wiring; and
an overvoltage protection circuit that protects the controller of the electric moving body from overvoltage,
wherein
the controller of the electric moving body that performs communication with the controller of the power storage pack using the power line and the communication wiring, the controller of the electric moving body causing the first switch to be turned off and the second switch to be turned on, and
the overvoltage protection circuit turns off the second switch upon detecting an overvoltage of the power line during communication between the controller of the electric moving body and the controller of the power storage pack.

6. The electric moving body according to claim 5, wherein the controller of the electric moving body
transmits identification information to the controller of the power storage pack via the power line and the communication wiring when the power storage pack is mounted to the electric moving body, and
collates whether or not identification information included in a received signal matches the transmitted identification information when receiving a signal transmitted by near-field communication, and authenticates that the power storage pack mounted to the electric moving body and a communication partner of the near-field communication are identical when the identification information included in the received signal matches the transmitted identification information.

7. A charging device comprising:
a charging slot;
a power line that connects between a charging source and a power source terminal of the charging slot;
a power line that connects between the charging slot and a charging source;
a first switch inserted into the power line;
a controller that communicates with a controller of a power storage pack in a state where the power storage pack is mounted into the charging slot;
a communication wiring that connects between a node of the power line closer to the power source terminal relative to the first switch and the controller of the charging device;
a second switch inserted into the communication wiring; and
an overvoltage protection circuit that protects a controller of the charging device from overvoltage,
wherein
the controller of the charging device performs communication with the controller of the power storage pack using the power line and the communication wiring, the controller of the charging device causing the first switch to be turned off and the second switch to be turned on, and
the overvoltage protection circuit turns off the second switch upon detecting an overvoltage of the power line during communication between the controller of the charging device and the controller of the power storage pack.

8. The charging device according to claim 7, wherein the controller of the charging device
transmits identification information to the controller of the power storage pack via the power line and the communication wiring when the power storage pack is mounted to the charging slot, and
receives a signal transmitted by near-field communication to collate whether or not identification information included in the signal received matches the identification information transmitted, and authenticates that the power storage pack mounted to the charging slot and a communication partner of the near-field communication are identical when the identification information included in the signal received matches the identification information transmitted.

* * * * *